US012793279B2

United States Patent

(12) United States Patent
Park et al.

(10) Patent No.: US 12,793,279 B2
(45) Date of Patent: Nov. 10, 2026

(54) POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

(71) Applicant: LG Electronics Inc., Seoul (KR)

(72) Inventors: Yousun Park, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 18/560,287

(22) PCT Filed: May 10, 2022

(86) PCT No.: PCT/KR2022/006637
§ 371 (c)(1),
(2) Date: Nov. 10, 2023

(87) PCT Pub. No.: WO2022/240128
PCT Pub. Date: Nov. 17, 2022

(65) Prior Publication Data
US 2024/0242390 A1 Jul. 18, 2024

(30) Foreign Application Priority Data
May 11, 2021 (KR) ........................ 10-2021-0060510

(51) Int. Cl.
*G06T 9/00* (2006.01)
*G06T 9/40* (2006.01)
(Continued)

(52) U.S. Cl.
CPC .................................... *G06T 9/001* (2013.01)

(58) Field of Classification Search
None
See application file for complete search history.

(56) References Cited

U.S. PATENT DOCUMENTS

2019/0228050 A1* 7/2019 Chou .................... G06F 17/175
2020/0021856 A1* 1/2020 Tourapis ................ H04N 19/13
(Continued)

OTHER PUBLICATIONS

3DG, "G-PCC codec description v2," ISO/IEC JTC1/SC29/WG11 N18189, Jan. 2019, Marrakech, MA, 39 pages.
(Continued)

*Primary Examiner* — Christopher Braniff
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. In addition, a point cloud data transmission device according to embodiments may comprise: an encoder which encodes point cloud data; and a transmitter which transmits a bitstream including the point cloud data. In addition, a point cloud data reception method according to embodiments may comprise the steps of: receiving a bitstream including point cloud data; and decoding the point cloud data. In addition, a point cloud data reception device according to embodiments may comprise: a receiver which receives a bitstream including point cloud data; and a decoder which decodes the point cloud data.

16 Claims, 26 Drawing Sheets

(51) Int. Cl.
*H04N 19/597* (2014.01)
*H04N 19/70* (2014.01)
*H04N 19/96* (2014.01)

(56) References Cited

U.S. PATENT DOCUMENTS

| | | | | |
|---|---|---|---|---|
| 2021/0105504 | A1 | 4/2021 | Hur et al. | |
| 2023/0101072 | A1* | 3/2023 | Wan | G06T 9/001 382/232 |

OTHER PUBLICATIONS

Extended European Search Report in European Appln. No. 22807776.4, mailed on Apr. 8, 2025, 9 pages.

Prazeres, "Static Point Clouds Compression Efficiency of Mpeg Point Clouds Coding Standards—A practical Comparison between Two Powerful PCC Codec's," Thesis for the Master's Degree in Electrical and Computer Engineering, The University of Beira Interior (Portugal), Jun. 2020, 120 pages

* cited by examiner

FIG. 7
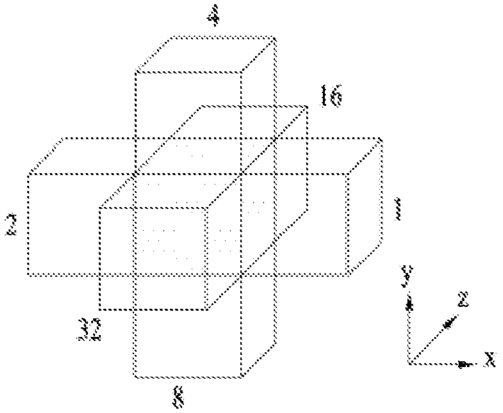
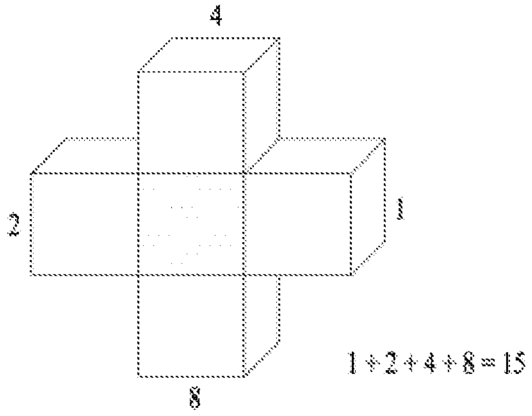

FIG. 21

| seq_parameter_set_rbsp( ) { | Descriptor |
|---|---|
| profile_idc | u(8) |
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i < sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| morton_index_use_flag | u(1) |
| if(morton_index_use_flag == 0) | |
| space_index_search_method | ue(v) |
| } | |
| NDim_LUT | ue(v) |
| neighbour_search_fuction | u(1) |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 22

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| } | |
| morton_index_use_flag | u(1) |
| if(morton_index_use_flag == 0) | |
| space_index_search_method | ue(v) |
| } | |
| NDim_LUT | ue(v) |
| neighbour_search_fuction | u(1) |
| } | |

FIG. 23

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| log2_neighbour_avail_boundary | ue(v) |
| log2_intra_pred_max_node_size | ue(v) |
| log2_trisoup_node_size | ue(v) |
| morton_index_use_flag | u(1) |
| if(morton_index_use_flag == 0) | |
| space_index_search_method | ue(v) |
| } | |
| NDim_LUT | ue(v) |
| neighbour_search_fuction | u(1) |
| gps_extension_present_flag | u(1) |
| if( gps_extension_present_flag ) | |
| while( more_data_in_byte_stream( ) ) | |
| gps_extension_data_flag | u(1) |
| byte_alignment( ) | |
| } | |

FIG. 24

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = ( attr_coding_type == 0 \|\| attr_coding_type == 2 ) ? 1 : 0 | |
| if( isLifting ) { | |
| num_pred_nearest_neighbours | ue(v) |
| max_num_direct_predictors | ue(v) |
| lifting_search_range | ue(v) |
| lifting_quant_step_size | ue(v) |
| lifting_quant_step_size_chroma | ue(v) |
| lod_binary_tree_enabled_flag | u(1) |
| num_detail_levels_minus1 | ue(v) |
| for( idx = 0; idx <= num_detail_levels_minus1; idx++ ) { | |
| sampling_distance_squared[ idx ] | ue(v) |
| } | |
| morton_index_use_flag | u(1) |
| if(morton_index_use_flag == 0) | |
| space_index_search_method | ue(v) |
| } | |
| NDim_LUT | ue(v) |
| neighbour_search_fuction | u(1) |
| if( attr_coding_type == 0 ) //PredictingLifting | |
| adaptive_prediction_threshold | ue(v) |
| } | |
| if( attribute_coding_type == 1 ) { //RAHT | |
| raht_depth | ue(v) |
| raht_quant_step_size | ue(v) |
| raht_quant_step_size_chroma | ue(v) |
| } | |
| aps_extension_present_flag | u(1) |
| if( aps_extension_present_flag ) | |
| while( more_data_in_byte_stream( ) ) | |
| aps_extension_data_flag | u(1) |
| byte_alignment( ) | |
| } | |

FIG. 25

| geometry_slice_header( ) { | Descriptor |
| --- | --- |
| gsh_geometry_parameter_set_id | ue(v) |
| gsh_tile_id | ue(v) |
| gsh_slice_id | ue(v) |
| if( gps_box_present_flag ) { | |
| gsh_box_log2_scale | ue(v) |
| gsh_box_origin_x | ue(v) |
| gsh_box_origin_y | ue(v) |
| gsh_box_origin_z | ue(v) |
| } | |
| gsh_log2_max_nodesize | ue(v) |
| gsh_points_number | ue(v) |
| morton_index_use_flag | u(1) |
| if(morton_index_use_flag == 0) | |
| space_index_search_method | ue(v) |
| } | |
| NDim_LUT | ue(v) |
| neighbour_search_fuction | u(1) |
| byte_alignment( ) | |
| } | |

POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

CROSS-REFERENCE TO RELATED APPLICATIONS

This application is a National Stage application under 35 U.S.C. § 371 of International Application No. PCT/KR2022/006637, filed on May 10, 2022, which claims the benefit of Korean Application No. 10-2021-0060510, filed on May 11, 2021. The disclosures of the prior applications are incorporated by reference in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 21 shows an example of syntax of a sequence parameter set according to embodiments;

FIG. 22 shows an example of syntax of a tile parameter set according to embodiments;

FIG. 23 shows an example of syntax of a geometry parameter set according to embodiments;

FIG. 24 shows an example of syntax of an attribute parameter set according to embodiments;

FIG. 25 shows an example of syntax of a geometry slice header according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
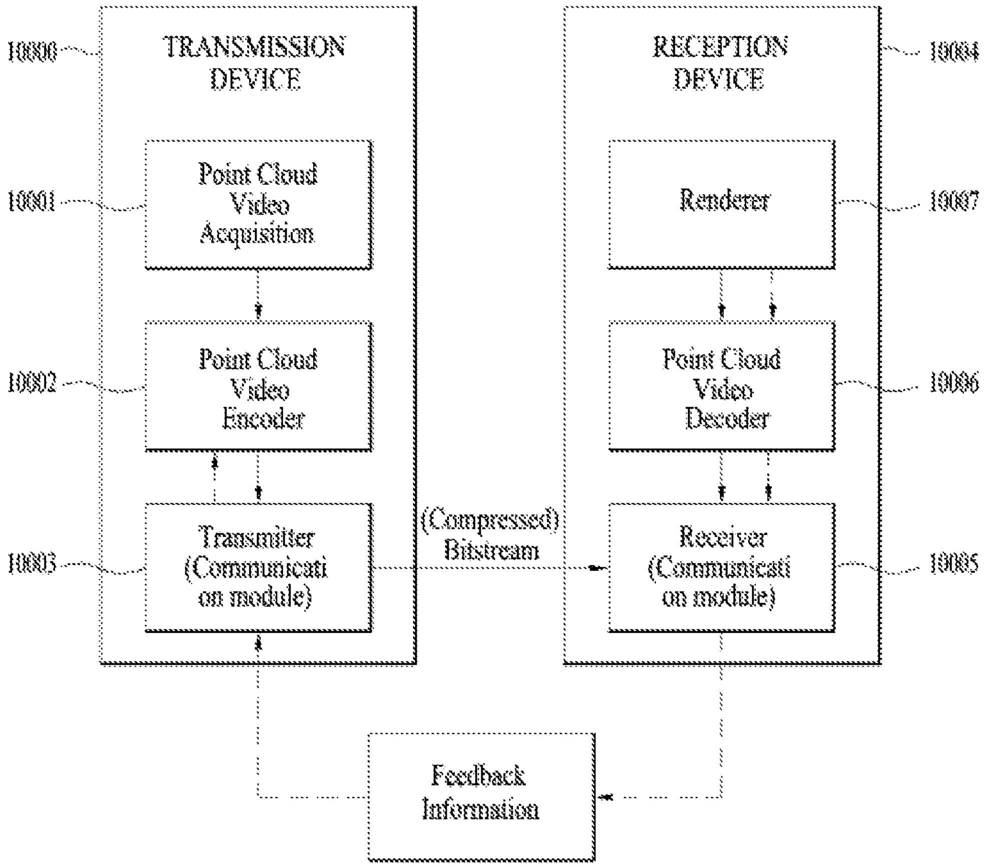
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer (Point Cloud Video Acquisition) 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
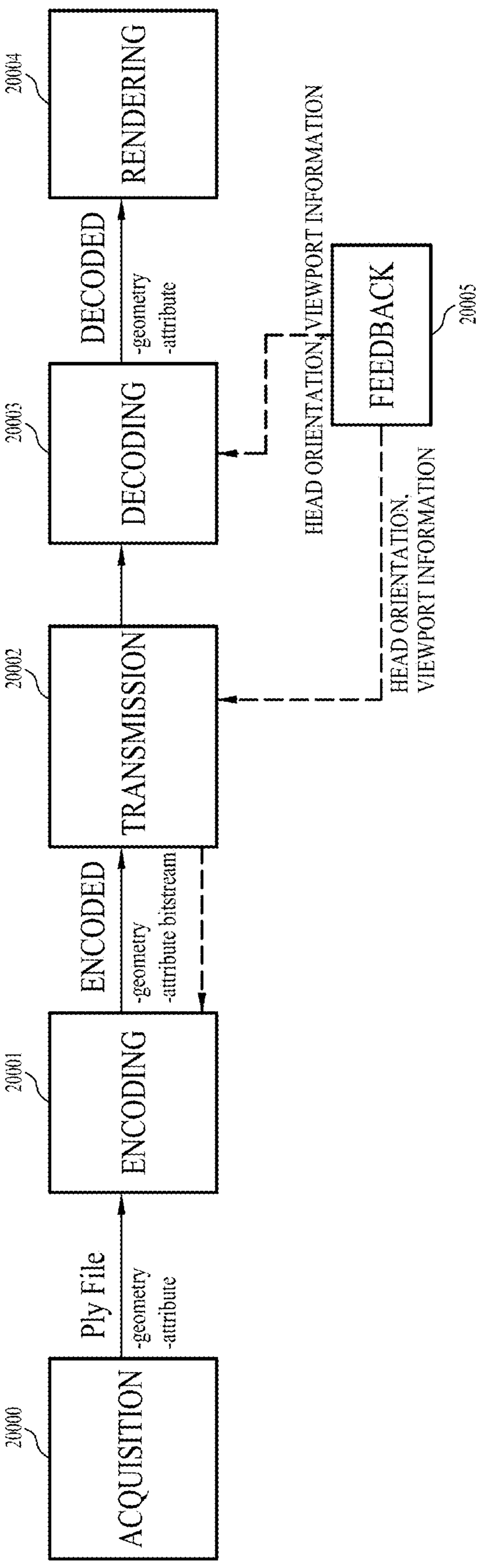
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
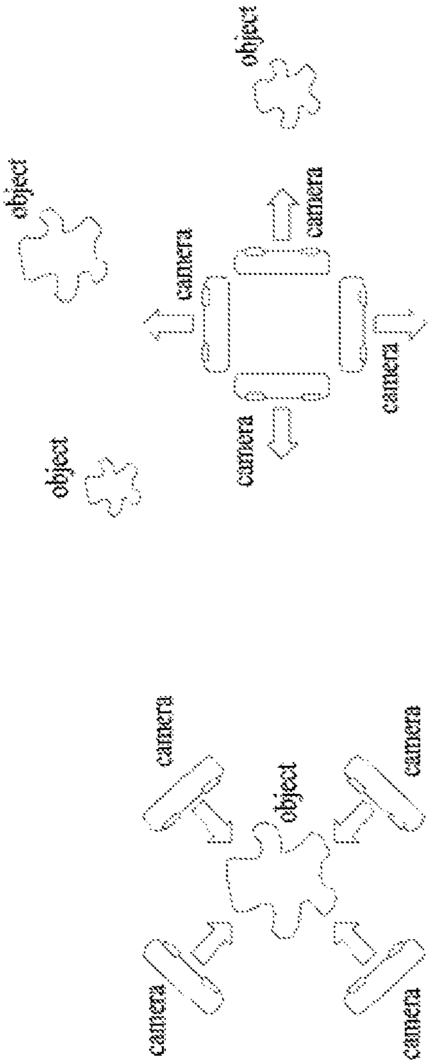
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
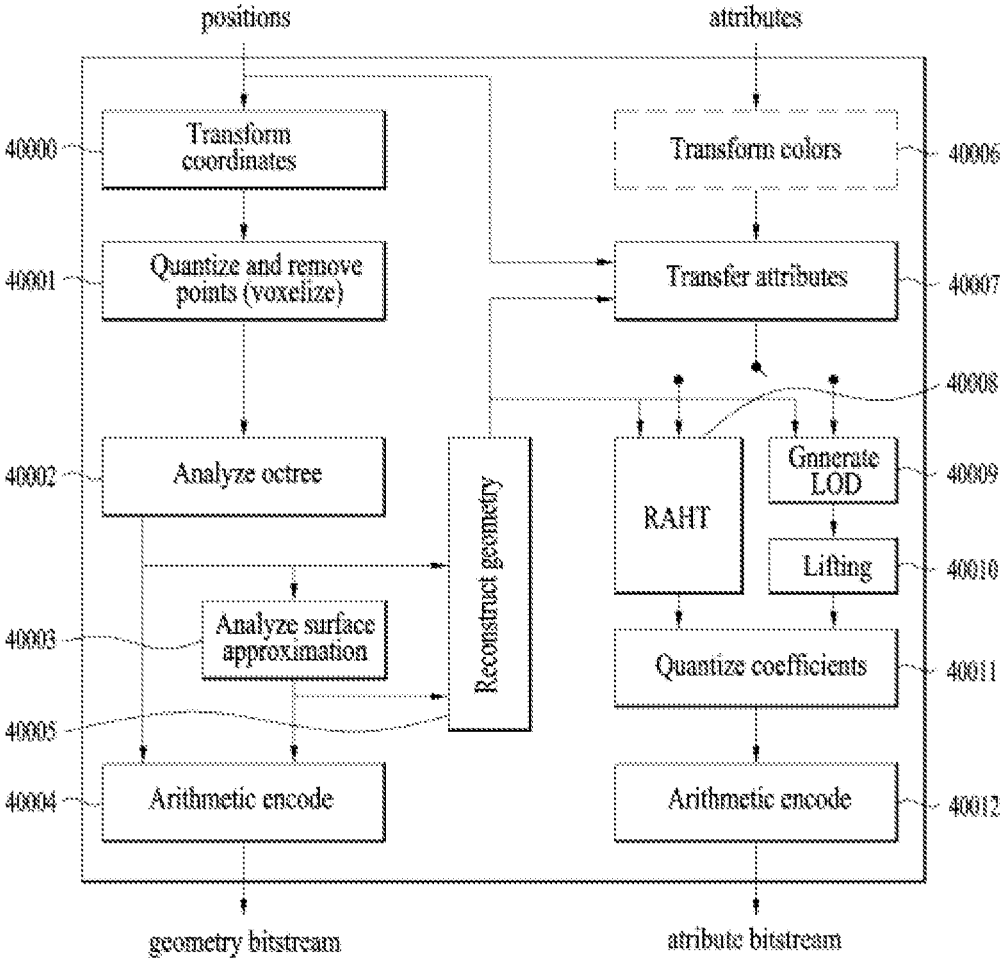
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
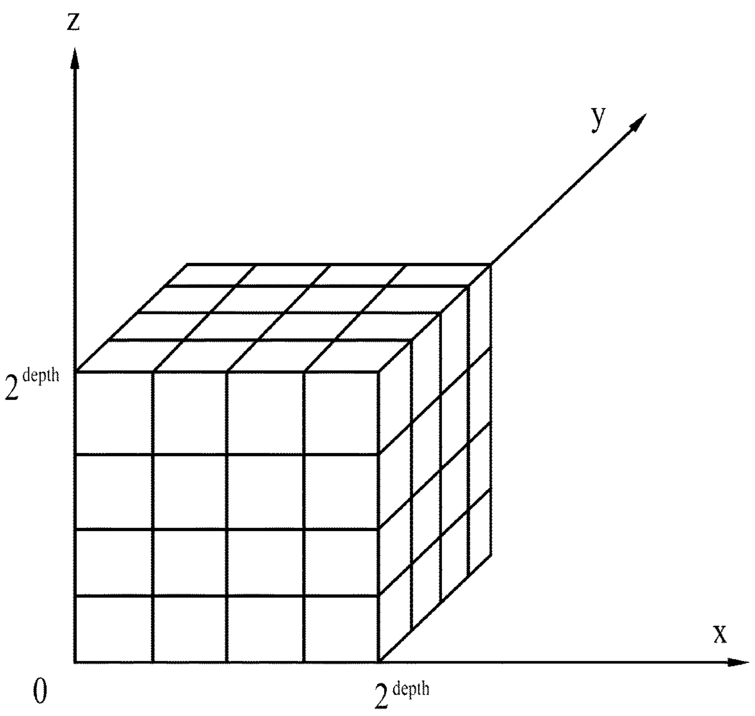
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
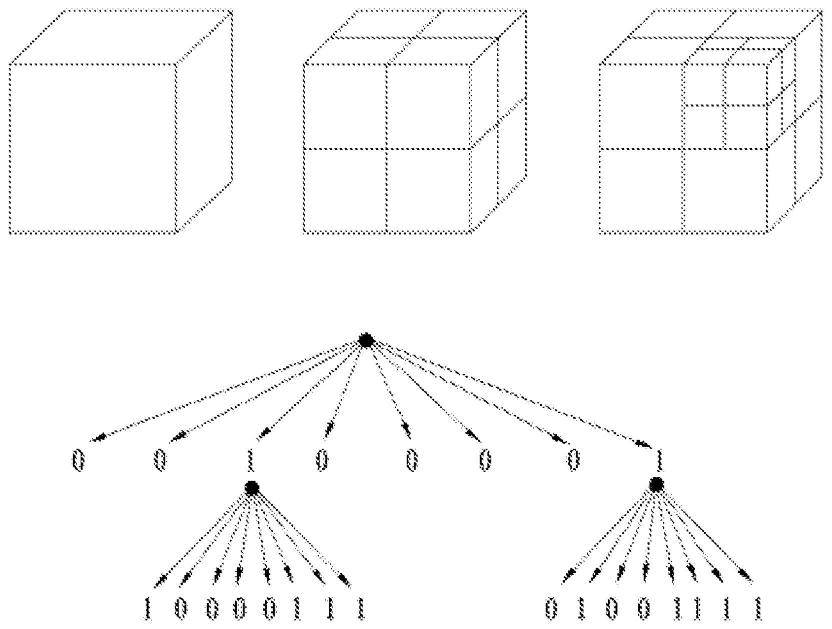
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$)

Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = Ceil\left(\text{Log2}\left(\text{Max}\left(x_n^{int}, y_n^{int}, z_n^{int}, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

i)

$$\begin{bmatrix}\mu_x\\ \mu_y\\ \mu_z\end{bmatrix}=\frac{1}{n}\sum_{i=1}^{n}\begin{bmatrix}x_i\\ y_i\\ z_i\end{bmatrix};$$

ii)

$$\begin{bmatrix}\bar{x}_i\\ \bar{y}_i\\ \bar{z}_i\end{bmatrix}=\begin{bmatrix}x_i\\ y_i\\ z_i\end{bmatrix}-\begin{bmatrix}\mu_x\\ \mu_y\\ \mu_z\end{bmatrix};$$

iii)

$$\begin{bmatrix}\sigma_x^2\\ \sigma_y^2\\ \sigma_z^2\end{bmatrix}=\sum_{i=1}^{n}\begin{bmatrix}\bar{x}_i^2\\ \bar{y}_i^2\\ \bar{z}_i^2\end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
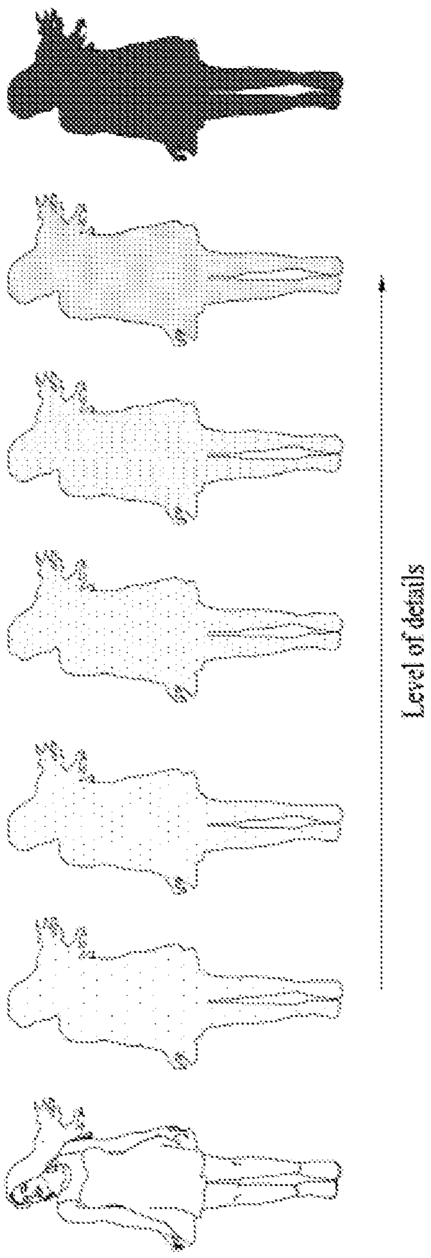
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (or reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
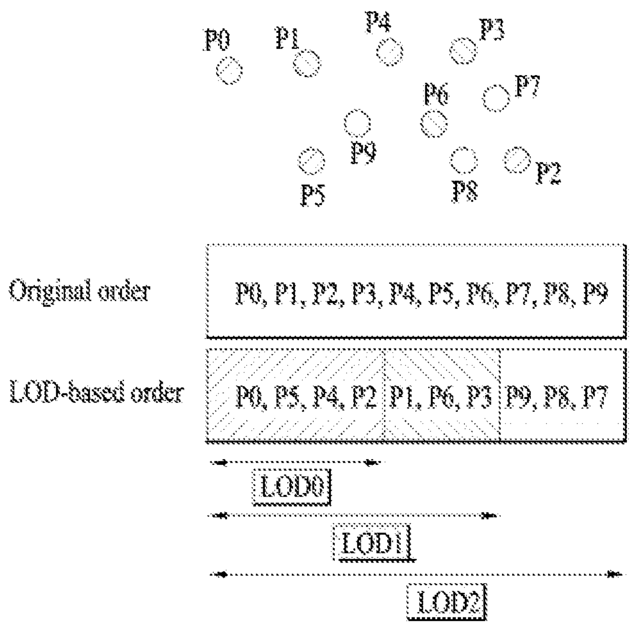
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, attribute residual value or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 2

Attribute prediction residuals inverse quantization pseudo code

```
int PCCInverseQuantization(int value, int quantStep) {
if( quantStep == 0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{xy.z}} \end{bmatrix} = T_{w1w2} \begin{bmatrix} g_{l_{2x,y,z}} \\ h_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
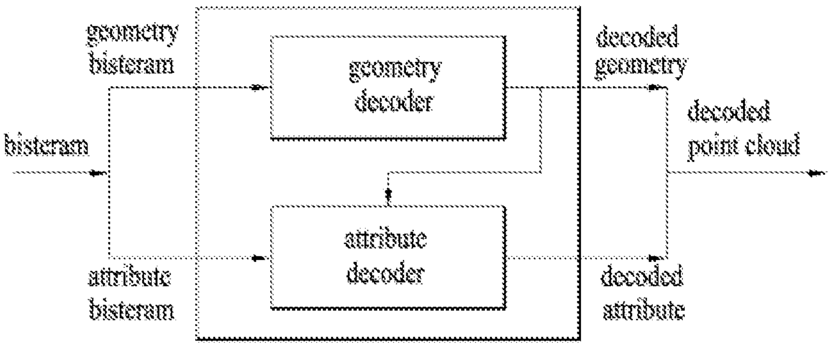
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
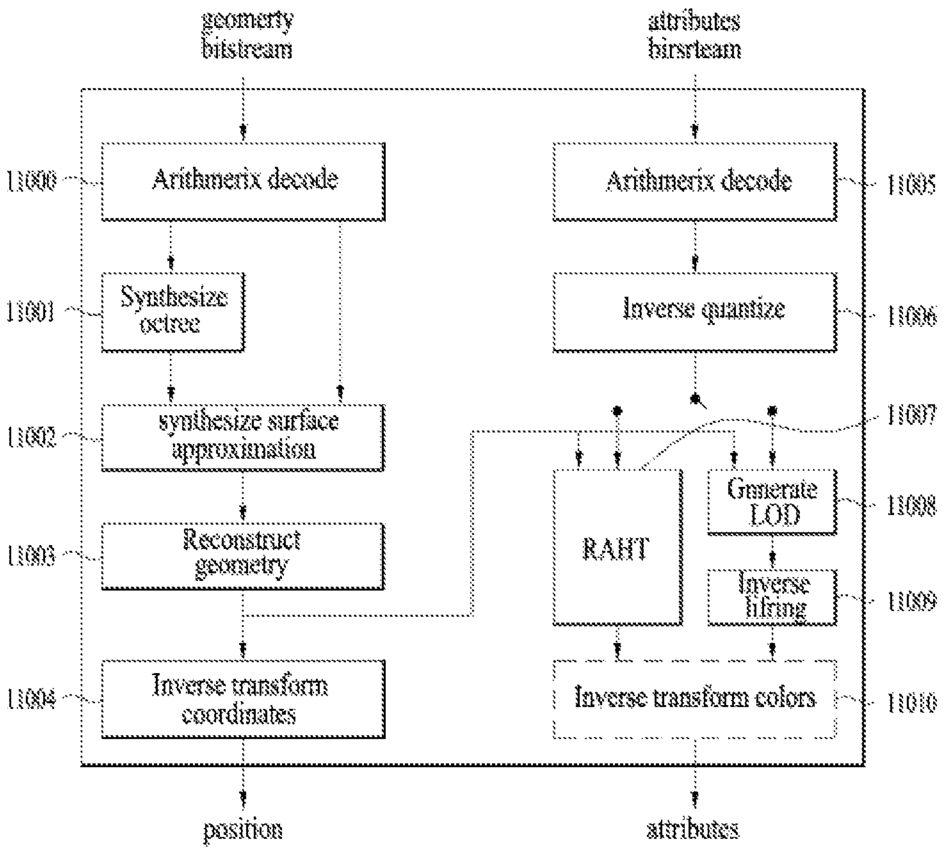
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
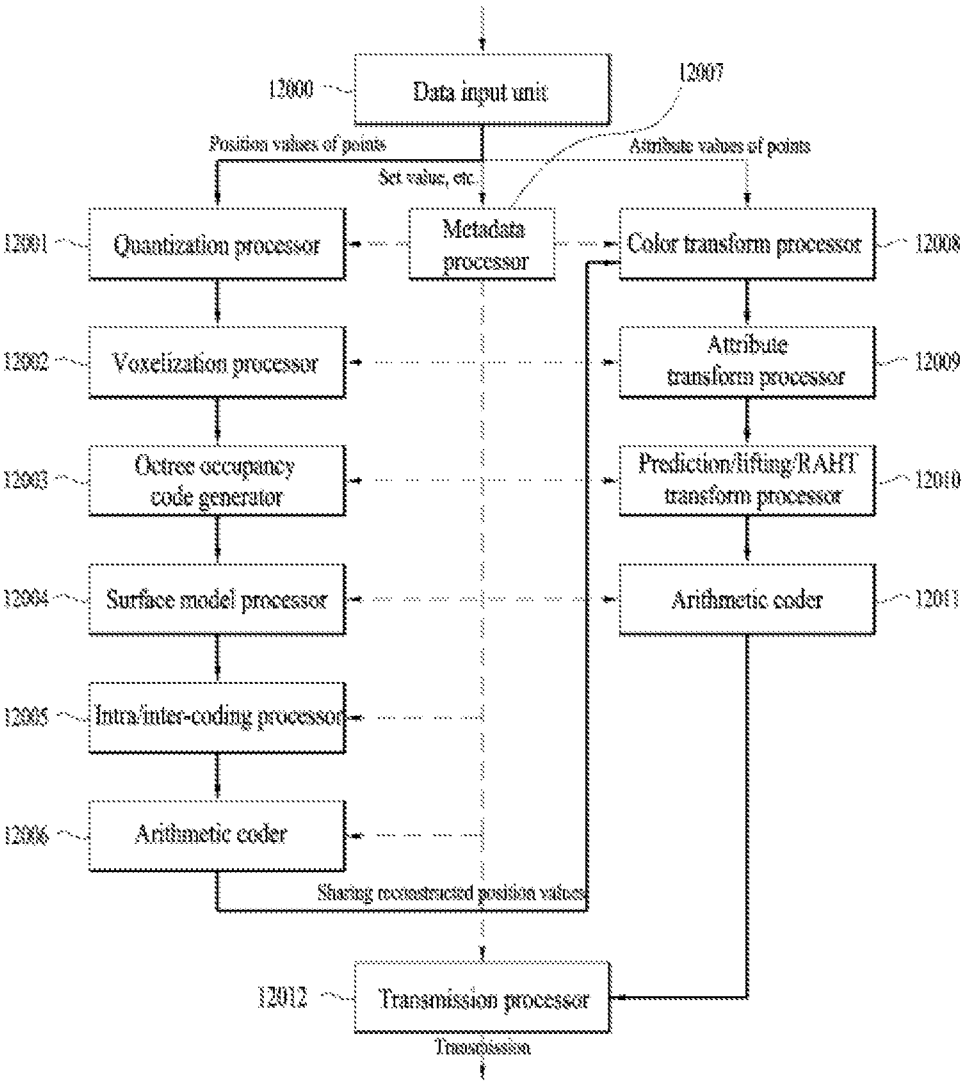
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
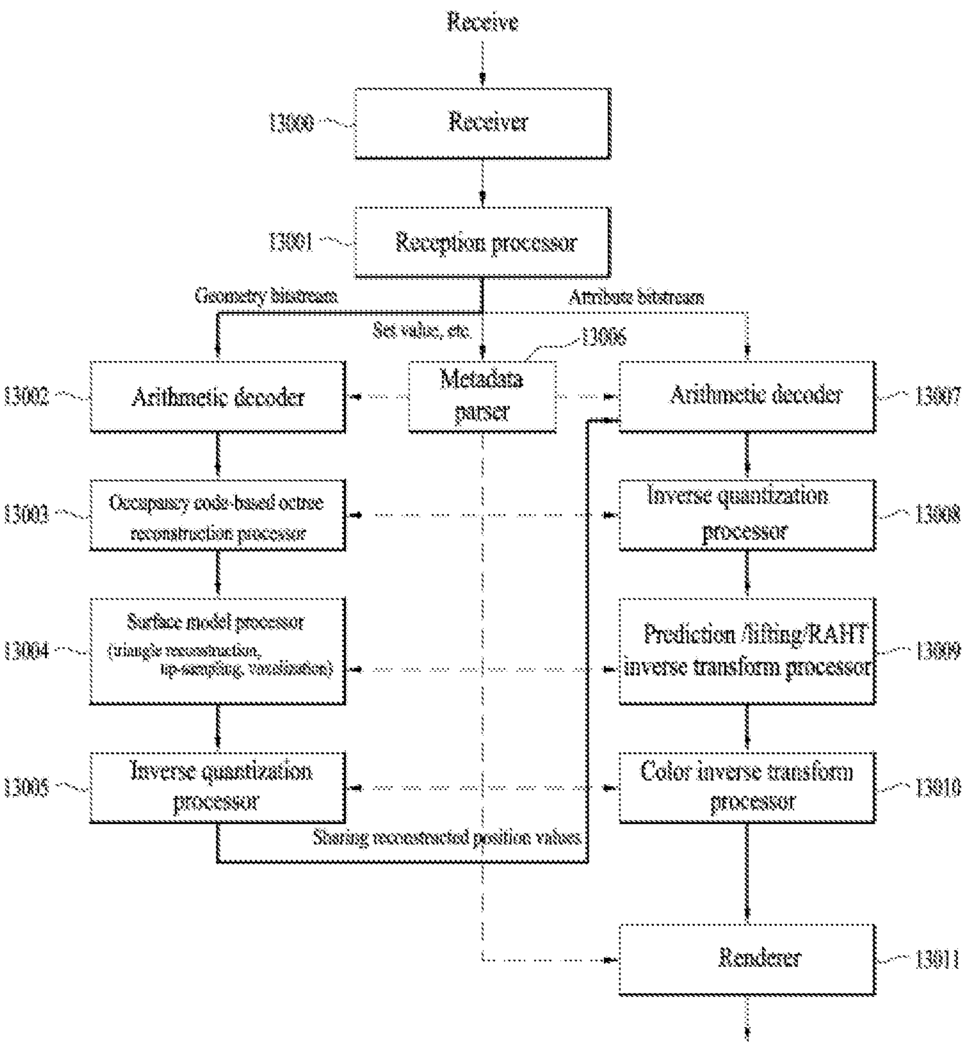
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
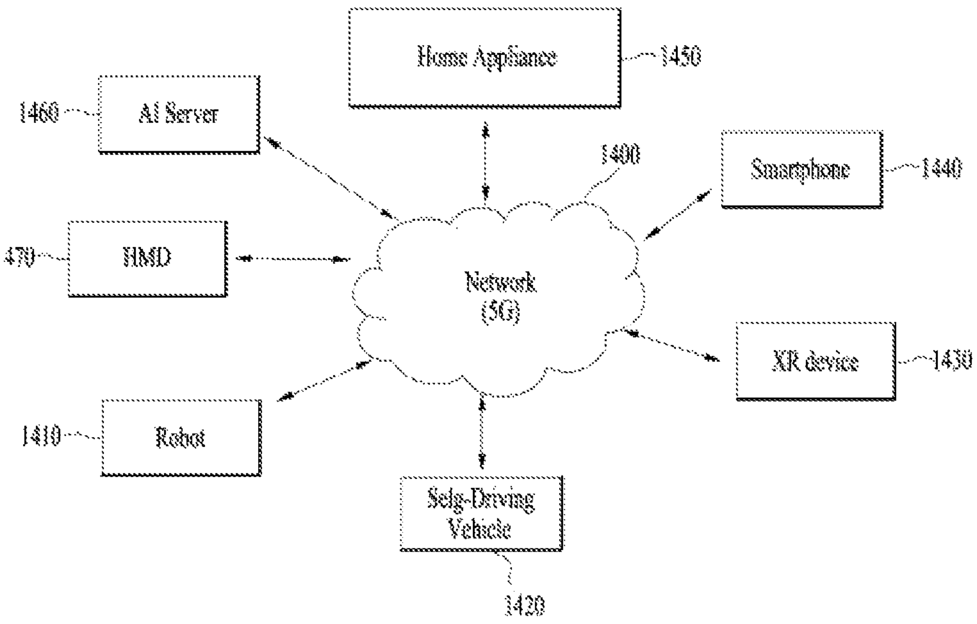
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, point cloud data is composed of a set of points, and each point may have geometry information and attribute information. The geometry information is information on the three-dimensional position (e.g., coordinates on the x, y, and z axes) of each point. In other words, the position of each point is represented by parameters of a coordinate system representing three-dimensional space (e.g., parameters (x, y, z) of the X-axis, Y-axis, and Z-axis, which are three axes representing space). The geometry information may be represented as (r, θ, z) of the cylindrical coordinate system or (r, θ, Φ) of the spherical coordinate system according to the coordinate system.

In addition, the attribute information may be a vector of values acquired by one or more sensors, such as the color (RGB, YUV, etc.), reflectance, normal vectors, transparency, brightness, temperature, and the like of a point. The attribute information may be expressed in the form of a scalar or vector.

According to embodiments, the point cloud data may be classified into category 1 of static point cloud data, category 2 of dynamic point cloud data, and category 3, which is acquired through dynamic movement, according to the type of the point cloud data and acquisition method therefor. Category 1 is composed of a point cloud of a single frame with a high density of points for an object or space. The data of category 3 may be divided into frame-based data having multiple frames acquired through movement and fused data of a single frame acquired by matching a point cloud acquired through a LiDAR sensor and a color image acquired as a 2D image for a large space. In addition, for data in Category 1, the color may constitute attribute information. For data in Category 3, the color, reflectance, and color+reflectance values may constitute attribute information according to the characteristics of the content.

Figure 15:
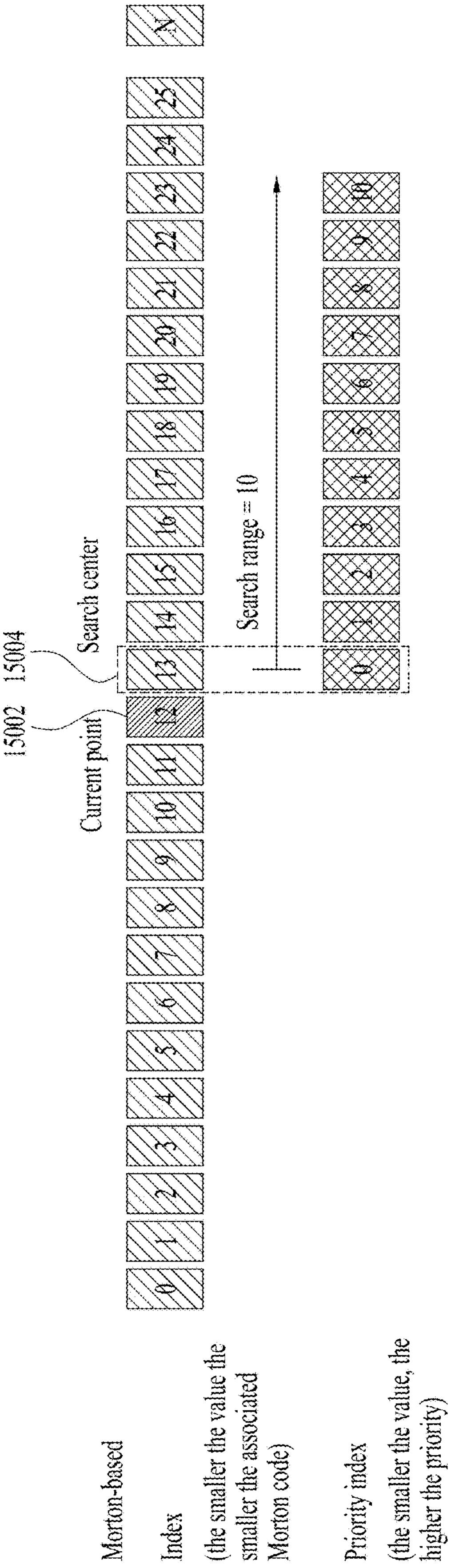
FIG. 15 illustrates an example of searching for neighbor points by a transmission/reception device according to embodiments.

FIG. 15 illustrates an example of searching for neighbor points (nodes) by a transmission/reception device according to embodiments. The transmission/reception device according to embodiments may increase compression efficiency by configuring levels of detail (LODs) and then searching for neighbor points that have the same or similar attribute information as the current point (or, node) based on the LODs.

The generation of LODs and search for neighbor points according to the embodiments may be performed by a point cloud data transmission/reception device (the transmission device or reception device of FIGS. 1, 4, 11 to 14, and 19) according to embodiments.

In decoding the point cloud data, the reception device according to embodiments receives an encoded geometry information (geometry) bitstream and attribute information bitstream, decodes the geometry information, and then decodes the attribute information based on the reconstructed geometry information.

In the encoding/decoding process of the transmission/reception device according to embodiments, the prediction transformation and the lifting transformation (prediction inverse transformation and lifting inverse transformation) may divide and group points based on LODs. LODs may be divided into levels based on subsampling. For example, some of the points belonging to a specific LOD may be sampled (or subsampled) to configure points belonging to another LOD. Here, the subsampling may include distance based subsampling, decimation based subsampling, and octree based (or block based) subsampling.

The distance based subsampling is a method of sampling based on the distance between points. For example, points that are farther away than a minimum distance from a specific point are sampled.

The decimation based subsampling is a method of sampling one or more points out of a specific number of points.

The octree based subsampling is a method of sampling one or more points at a specific node based on the node (or block) of the octree corresponding to the LOD.

As such, in the LOD generation process of the transmission/reception device according to embodiments, points may be divided and grouped by subsampling. A group of points belonging to an LOD may be referred to as an LODI, where I denotes the level of the LOD and is an integer starting from 0. LOD0 is the set with the largest distance between points. As I increases, the distance between points in the LOD decreases.

An LOD may include N levels, and the points in each level may be sorted into a one-dimensional array based on Morton order. The sorting of the points (or the space search) may be based on a Morton curve, a Hilbert curve, a Peano curve, or a Gray curve.

The method of neighbor point search of the transmission/reception device according to embodiments may be differentiated between a case of one LOD and a case of N LODs.

FIG. 15 illustrates an example of neighbor point search in the case of one LOD. Referring to FIG. 15, the current point 15002 corresponds to the twelfth index in the order of the points sorted based on the Morton code. When the transmission/reception device searches for neighbors of the current point, it may search for points within a specific search range (e.g., a search range of 10 points) based on the index of the current point as neighbors.

In this case, the weight of each neighbor point may be normalized based on the total sum of the weights of its closest neighbor points to apply a weight based on the distance between the points and the current point. For example, when the current point p0 has three neighbors p1, p2, and p3, the weight of each neighbor point may be calculated as $1/|p1-p0|$, $1/|p2-p0|$, $1/|p3-p0|$. The transmission and reception devices may divide the weight of each neighbor point by the total sum of the calculated weights, and predict geometry information or attribute information based on the neighbor points for the current point.

More specifically, in FIG. 15, points belonging to one LOD are sorted based on the Morton order. Therefore, as the Morton code index decreases, the index of a point in order decreases. The current point is at the twelfth position in Morton order, and thus has a sequence index of 12. When searching for neighbors of the current point, a specific search center may be defined based on the sequence index of 12 of the current point, and points within a specific search range (e.g., no more than 10 sequence indexes) may be searched based on the search center 15004.

Referring to FIG. 15, the search center may be a point with a sequence index of 13, and a neighbor point search may be performed in the range from point 13 to a point with a sequence index of 23. The neighbor point search may be performed starting at point 13 and proceeding up to point 23 in order. FIG. 15 shows that, as a priority index indicating an order of search decreases, the search priority increases.

Figure 16:
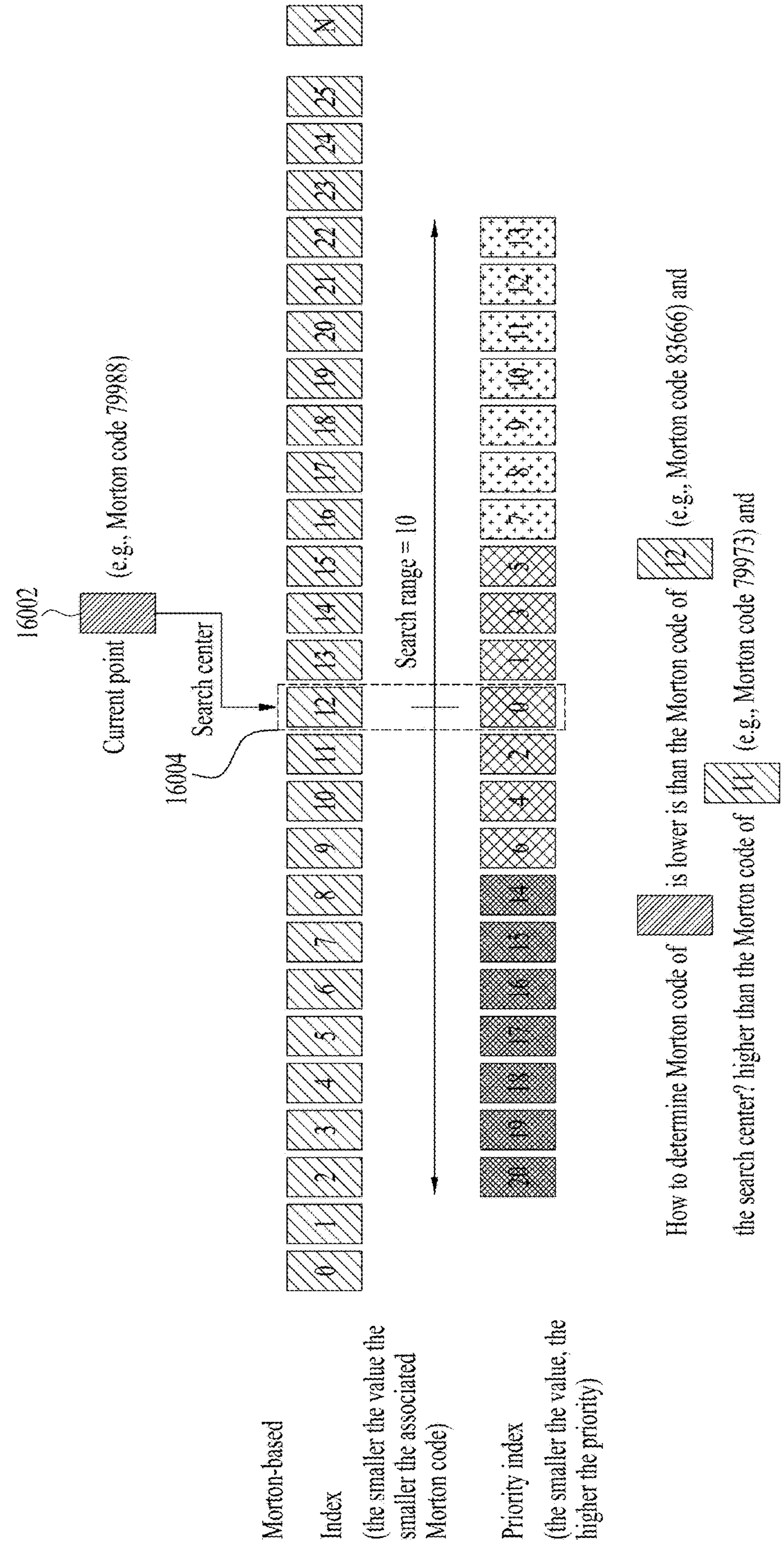
FIG. 16 illustrates an example of neighbor point search by a transmission/reception device according to embodiments.

FIG. 16 illustrates an example of searching for neighbor points for a plurality of LODs by a transmission/reception device according to embodiments. Referring to FIG. 16, a search center may be defined based on the current point, and points within a specific search range before or after the search center may be searched. Calculation may be performed by applying weights to three (or more) neighbor points closest to the current point in terms of distance among the searched points, and a prediction may be performed for the current point.

Specifically, referring to FIG. 16, in the case where there are multiple LODs, a search center 16004 may be defined based on a Morton code index (e.g., 79988) of the current point 16002 belonging to a specific LOD. In FIG. 16, the search center 16004 may be defined as a point with a sequence index of 12 that belongs to another LOD, and the Morton code index (e.g., 83666) of the point with a sequence index of 12 is greater than the Morton code index of 79988 of the current point 16002. The point with the Morton code index closest to the current point 16002 may be set as the search center 16004. The neighbor point search according to embodiments may be performed for points within a specific range (e.g., a search range of 10 or 128 indexes) before or after the set search center 16004 among the points sorted in order according to a specific sorting method. The order in which the neighbor point search is performed may be represented by a priority index, and the neighbor point search may be performed in the direction in which the index difference increases, alternating between front and back.

According to the neighbor point search process according to the embodiments described with reference to FIGS. 15 and 16, when the points are sorted in a specific manner (e.g., sorting in Morton order), a point may be positioned farther away from the current point in the sorted order, even though the point is actually closer to the current point. For example, among points sorted based on the Morton code index, a point with the sequence index of 48 may be at a close Euclidean distance from the current point with the sequence index of 7, but may be positioned outside of any search range in the sorted order.

In this way, a point that is at a close distance to the current point, but has a large index difference from the current point in the order in which the points are sorted may not be searched for as a neighbor, which may reduce the accuracy of the neighbor search. Points with this characteristic may be referred to as jumping points. The criteria for a jumping point may vary depending on the search range for neighbor points and the Euclidean distance from the current point.

The point cloud data transmission/reception device (transmission/reception device of FIGS. 1, 4, 11, 12, 13, and 19) according to embodiments may search for a jumping point as a neighbor point in searching for neighbor points. Specifically, the point cloud data transmission/reception device according to the embodiments may use a neighbor node table to acquire information about the jumping point. Further, the point cloud data transmission/reception device according to the embodiments may perform a neighbor search for the jumping point based on the sequence indexes of the points defined according to a specific sorting method (e.g., Morton code order) and predict the current point. According to embodiments, the probability of actually finding the nearest neighbor point may be increased, thereby improving the accuracy of the predicted value and increasing compression efficiency.

The point cloud data transmission/reception device according to embodiments uses a neighborhood node table that includes information about jumping points in relation to a three-dimensional (or N-dimensional) space. Further, the point cloud data transmission/reception device according to embodiments may reference the neighbor node table based on indexes according to a specific point sorting method. In addition, the point cloud data transmission/reception device according to embodiments may use various space search schemes or point sorting methods to search for neighbor points in addition to the sorting method based on the Morton code index.

The Morton code index-based sorting method provides a method to search for nearest neighbor points in a one-dimensional array. However, in three-dimensional space, distance does not accurately reflect close positions and thus additional information is required.

The point cloud data transmission/reception device according to embodiments may use a neighbor node table (which may be referred to as a look up table (LUT)) to search for neighbor points in a 3×3×3 space or larger. Also, neighbor points may be searched for based on an index according to a specific sorting method (e.g., Morton order). In this case, the information contained in the neighbor node table may extend to an N-dimensional space, and the sorting method for the points may include a sorting method based on a Hilbert curve, a Peano curve, or a Gray curve.

Figure 17:
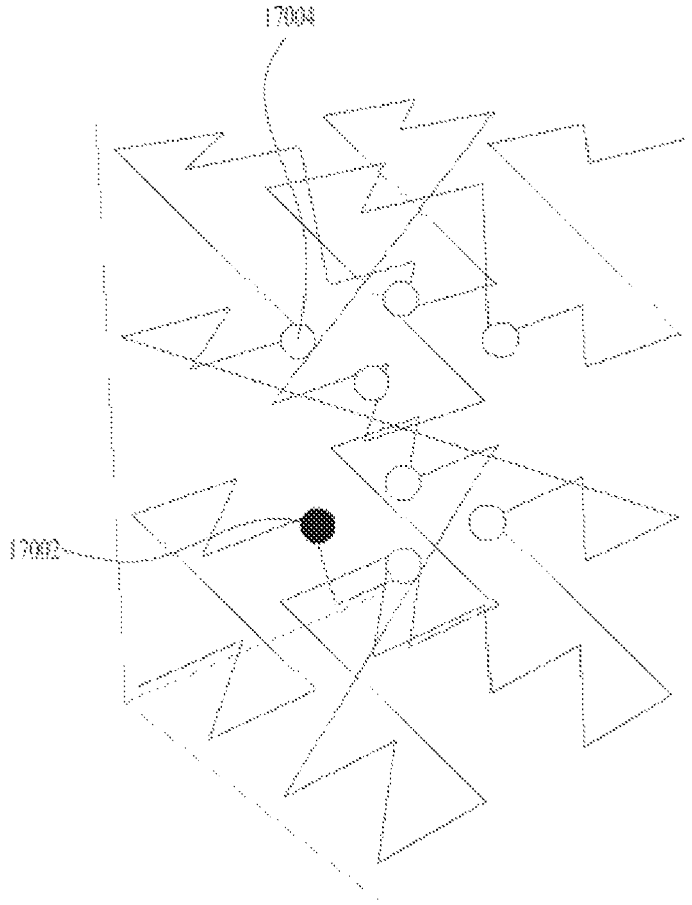
FIG. 17 illustrates an example of a jumping point among points sorted in Morton order according to embodiments.

FIG. 17 illustrates an example of a jumping point among points sorted in Morton order according to embodiments. FIG. 17 shows points 17004 that are distant in Morton sequence index from the current point 17002, but close in distance to the current point 17002. The points may be sorted in Morton order such that neighbor points may be searched for in a "Z" shaped search order.

In searching for a neighbor point based on a one-dimensional Morton sequence index, a jumping point cannot be considered as a neighbor point, and therefore a neighbor node table may be used. Referring to FIG. 17, based on the current point 17002, the jumping point 17004 may include seven white points. The "Z" shaped curve may indicate the direction of the neighbor point search in searching for neighbors of the current point 17002. The seven white points may be +1 or −1 away from the current point 17002 along the X-axis, Y-axis, or Z-axis, but may differ by up to 49 in terms of the Morton code sequence index when sorted based on the Morton code index.

When a point is outside the search range in terms of the Morton code index, but close in Euclidean distance to the current point, the point cloud data transmission/reception device according to embodiments may reference the neighbor node table to determine that the point is a neighbor point. In addition, the neighbor node table may be referenced based on the Morton code index, and various other space searches (point sorting methods) may be applied to search for neighbor points.

An example of a one-dimensional array of a neighbor node table is shown below.

```
NeighOffset[27] = {7, 3, 5, 6, 35, 21, 14, 28, 42, 12, 10, 17, 20, 34,
33, 4, 2, 1, 56, 24, 40, 48, 32, 16, 8, 0}
```

This array contains sequence indexes for finding a jumping point 17004 that is a neighbor of the current point 17002 when searching for a neighbor point. The values of the indexes in the neighbor node table (NeighOffset) list the indexes of all points within a distance of +1 or −1 along the x, y, and z axes when the current point 17002 has an index of 7 (NeighOffset[0]=7) (NeighOffset[1] to NeighOffset [26]).

Thus, when searching for a neighbor point, the transmission/reception device according to embodiments may reference the neighbor node table (NeighOffset) for the index value of a jumping point outside the search range. Also, only the index values contained in the neighbor node table (NeighOffset) may be used for neighbor point search. The 26 indexes in the neighbor node table represent 26 points that are adjacent to (or neighboring) each other.

In the neighbor point search according to embodiments, a neighbor point that may be used to predict the current point may be referred to as a predictor. Also, in the neighbor point search according to embodiments, a point may be referred to as a block. In the neighbor point search according to embodiments, blocks that are within an availability window among the blocks adjacent to the block containing the current point may be searched. The availability window according to the embodiments may be referred to as a search range. The availability window may have a volume of an 128×128×128 block. Within the searched block, the points may be searched in order of indexes sorted by LOD level.

In the block search according to embodiments, the blocks may be searched according to the search order and coordinate information about the blocks. The search order and coordinate information about the blocks may be information contained in a table represented by rows or columns.

The neighbor node table according to the embodiments may be expanded to cover a wider range of space. The neighbor node table according to the embodiments may provide a method of neighbor point search based on the relative position and size of the space in which the current point is positioned. The neighbor node table according to the embodiments may contain index information about jumping points for a 3×3×3 space, a 4×4×4 space, or a larger space. The neighbor node table according to the embodiments may include rows and columns, wherein each of the rows may contain index information about points that neighbor each other. That is, points represented by indexes contained in the same row may be points that neighbor each other. Some of the indexes in the same row in the neighbor node table may represent jump points for the current point.

Here is an example of a neighbor node table (or look up table) for points sorted based on the Morton code in a 4×4×4 space.

```
NeighOffset_ext[8][27] = {
{7, 3, 5, 6, 35, 21, 14, 28, 42, 49, 12, 10, 17, 20, 34, 33, 4, 2,
1, 56, 24, 40, 48, 32, 16, 8, 0},
{14, 10, 12, 7, 42, 28, 15, 29, 43, 56, 13, 11, 24, 21, 35, 40, 5,
3, 8, 57, 25, 41, 49, 33, 17, 9, 1},
{21, 17, 7, 20, 49, 23, 28, 30, 56, 51, 14, 24, 19, 22, 48, 35, 6,
16, 3, 58, 26, 42, 50, 34, 18, 10, 2},
{28, 24, 14, 21, 56, 30, 29, 31, 57, 58, 15, 25, 26, 23, 49, 42, 7,
17, 10, 59, 27, 43, 51, 35, 19, 11, 3},
{35, 7, 33, 34, 39, 49, 42, 56, 46, 53, 40, 14, 21, 48, 38, 37, 32,
6, 5, 60, 28, 44, 52, 36, 20, 12, 4},
```

-continued

```
{42, 14, 40, 35, 46, 56, 43, 57, 47, 60, 41, 15, 28, 49, 39, 44, 33,
7, 12, 61, 29, 45, 53, 37, 21, 13, 5},
{49, 21, 35, 48, 53, 51, 56, 58, 60, 55, 42, 28, 23, 50, 52, 39, 34,
20, 7, 62, 30, 46, 54, 38, 22, 14, 6},
{56, 28, 42, 49, 60, 58, 57, 59, 61, 62, 43, 29, 30, 51, 53, 46, 35,
21, 14, 63, 31, 47, 55, 39, 23, 15, 7}
}
```

The neighbor node table above is an array of 8 rows and 27 columns.

The rows of the neighbor node table (NeighOffset_ext) may contain in the first column an index (e.g., an index that is a multiple of 7 in 4×4×4 space) to the point at which a jumping point occurs when the points are sorted in a specific sorting order (e.g., Morton order). The presence of a jumping point indicates that, when the current point is at the corresponding position, there is a point that is within a specific Euclidean distance from the current point, but outside a specific search range in terms of index.

The number of rows in the neighbor node table may be the number of indexes representing points where the jumping point happens in an N×N×N space (e.g., 4×4×4 space). The number of columns in the neighbor node table is the total number of neighboring points for the points contained in a row. The neighboring points may include jumping points.

Figure 18:
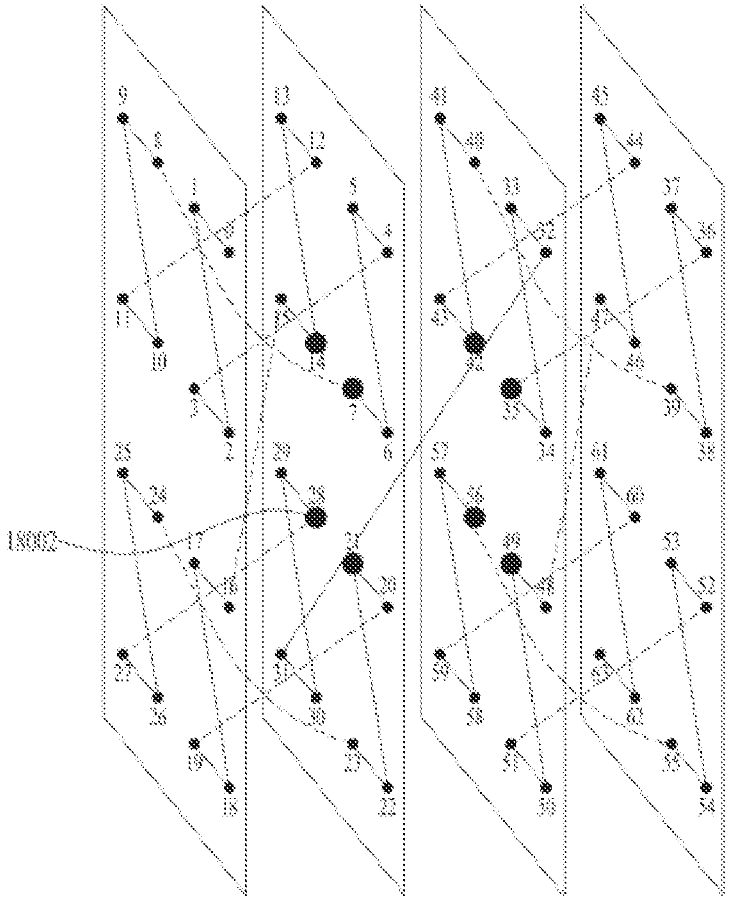
FIG. 18 illustrates an example of point positions and indexes sorted in Morton order according to embodiments.

FIG. 18 shows the positions of points sorted in Morton order in a 4×4×4 space and indexes (0 to 63) for the respective positions according to embodiments.

Referring to FIG. 18, in a 4×4×4 space, the number of indexes representing points where jumping points occur is 8 (indexes 7, 14, 21, 28, 35, 42, 49, 56), and therefore the number of rows in the neighbor node table is 8. Each row in the neighbor node table may contain indexes representing points positioned within a distance of 1 to 13 from the position of the point where the jumping point occurs. In this case, the reference distance may change.

The indexes contained in the rows or columns of the neighbor node table according to the embodiments may be equally applied by the transmission/reception device according to the embodiments, regardless of the order in which they are listed in the neighbor node table.

The neighbor node table according to the embodiments is for a 4×4×4 space. Referring to FIG. 18, a 4×4×4 space may represent a total of 64 point positions. When the 64 point positions in the 4×4×4 space are sorted in a specific manner (e.g., Morton order), they may be given indexes based on the order in which they are sorted. Thus, the positions of the points where a jumping point occurs in the 4×4×4 space may be represented using an index. For example, in a 4×4×4 space, sequence indexes 7, 14, 21, 28, 35, 42, 49, 56 are positions where the jumping point may occur.

When the index of the current point is 35 when the transmission/reception device searches for neighbor points according to embodiments, index 60 may correspond to a jumping point that is not within the neighbor point search range (e.g., 10 points) based on index 35, but whose position is close to index 35. The transmission/reception device according to embodiments may search for the point represented by the sequence index 60 in the neighbor node table as a neighbor point.

As shown in FIG. 18, when the points are sorted based on Morton code indexes in a 4×4×4 space, the indexes 7, 14, 21, 28, 35, 42, 49, 56 at which the jumping points occur are eight and may be presented in the first column of each row of the neighbor node table. The 27 indexes constituting each row in the neighbor node table may include indexes representing points that neighbor (e.g., within a distance of 1 to 13) the position where the jumping point occurs.

In other words, the index at which the jumping point occurs and the indexes of the 26 neighbor points may be presented in 26 columns. In an N×N×N space expanded from the 4×4×4 space, the number of rows and columns in the neighbor node table and the values contained in the rows and columns may change. Accordingly, the indexes representing neighbor points may change. The neighbor node table for an N×N×N space may contain the index values representing the jumping points using an N-dimensional array of NeighOffset_ext[i][j][k].

The transmission/reception device according to embodiments may search for neighbors of the current point based on the neighbor node table (NeighOffset_ext) as follows.

In the case of points sorted in Morton order in a 4×4×4 space, when the Morton code index MC_idx of the current point is 138, the Morton code index 138 is divided by 64 (based on the 4×4×4 space). The quotient is 2 and the remainder is 10. Then, the transmission/reception device according to the embodiments may reference a row of the neighbor node table based on the calculated quotient and present the index of the current point in the 4×4×4 space where the current point is positioned based on the calculated remainder. Thus, in the example above, row 2 of the neighbor node table may be referenced to determine whether row 2 contains the sequence index 10. When the second row contains the sequence index 10, all the indexes in row 2 may represent points that are neighbors of the current point.

Referring to the neighbor node table above, row 2 ({21, 17, 7, 20, . . . , 10, 2}) of the neighbor node table contains index 10 in column 25. Therefore, the 26 indexes in row 2, excluding index 10, may represent neighbor points for the current point. The first index 21 in row 2 of the neighbor node table may be construed as a point with a Morton code index of 149 because 64(4×4×4)×2(quotient)+21 (index)=149. Therefore, the point with Morton code index 149 is searched as a neighbor of the current point (Morton code index 138). The second index in row 2 of the neighbor node table, 17, may be construed as a point with a Morton code index of 145, because 64 (4×4×4)×2 (quotient)+17 (index)=145. Therefore, the point with Morton code index 145 may be searched as a neighbor of the current point (Morton code index 138). In the same way, other indexes (except index 10) in row 2 of the neighbor node table may be converted to Morton code indexes and searched as neighbor points.

The N-dimensional array of the neighbor node table according to embodiments may be a predefined matrix table (or look up table). Further, the transmission/reception device according to embodiments may calculate i, j, and k of the neighbor node table from an index based on a specific sorting method (e.g., Morton order-based index).

Based on an N×N×N space, i may denote a row in the neighbor node table and j may denote an index.

$$i = MC\_idx/N$$

$$j = MC\_idx \% N$$

MC_idx: Morton index

When index j is present in row i of the neighbor node table, the transmission/reception device according to embodiments may search for points included in row i of the neighbor node table as neighbor points. When index j is not present in row i of the neighbor node table, the transmission/reception device according to embodiments may search for points within a search range based on the current point in the order of sorting of the points as neighbor points.

The Morton code indexes may be sorted into values from 0 to 2^3n (where n is a bitdepth). The transmission/reception device according to embodiments may search for neighbor points in a specific backward and forward search range (e.g., a range of 128 indexes) based on the index of the current point. The closer the position of the sorted point is to the position of the current point, the more likely it is that that point has similar attribute information to the current point is searched as a neighbor. When there is a similar point at a close distance, the distance is below a threshold, and thus redundant searches are excluded, thereby reducing the decoding time.

In order to search for points that are close in Euclidean distance but far away in Morton index order, the Morton index for the index of the current point may be modified by an equation. Referring to FIG. 18, when the sequence index of the current point is 7, 14, 21, 28, 35, 42, 49, and 56 are positions where jumping points occur. Accordingly, when the current point index % 7=0, 14, 21, 28, 35, 42, 49, and 56 are all positioned at a distance of 1 to 13, but the Morton indexes therefor may be at a distance of 7 to 49. Accordingly, the transmission/reception device according to embodiments may take the indexes rather than a closer distance in Morton index to perform the neighbor point search.

The transmission/reception device according to embodiments may search for jumping points first by reprioritizing the jumping points using a formula for neighbor point search. In this case, the formula may be MC_jump={(ex. 7, 14, 21, 28, 35, 42, 49, 56 . . . )}, a set of indexes at which the jumping point occurs, and a set of neighbor points (E_dist_NN) with close Euclidean distance but distant Morton code indexes may be defined. E_dist_NN of specific Indexes may be searched using the MC_jump set as follows.

Points neighboring the current point in a 4×4×4 space or larger may be found through a calculation based on the Morton code index, and neighbor points (points at a distance of 1 to 13) in an N×N×N space may be searched for based on the current point by the following equation.

When the current index/8^(n+1) % α=0, (current index/8^n+α)*β

$$\text{For a } 3\times3\times3 \text{ space}, \alpha = 1, \beta = 27$$

$$\text{For a } 4\times4\times4 \text{ space}, \alpha = 8, \beta = 27$$

When current index/8^(n+1) % α is not 0, use a look up table or an index equation based on another space search Index equation based on another space search $$E\_dist\_NN = \{ = NN | NN = MCi \ \% \ N, NN \in E\_dist\_NN \}$$

Mci: Morton code index

N: Size of search space

NN: Neighbor point

The Morton code index may be calculated by bit-interleaving the three-dimensional point cloud data. The transmission/reception device according to embodiments may search for a jumping point for the current point as a neighbor point by calculation using the neighbor node table (or look up table) and the Morton code index according to embodiments.

Other space search methods may be applied to find points that are close in Euclidean distance to the current point in three-dimensional space. The transmission/reception device according to embodiments may use a Hilbert curve as a point sorting method for neighbor search. The Hilbert curve is characterized by presence within a distance of +1 or −1 with no jumping from the current point. Experiments have shown that high compression efficiency is achieved for high rate attribute information neighbor search and high compression efficiency is achieved for attribute predicting transform. In addition, the transmission/reception device according to embodiments may use various space search algorithms capable of searching in N dimensions, such as the Peano curve and the Gray curve, as a point sorting method for neighbor search.

Figure 19:
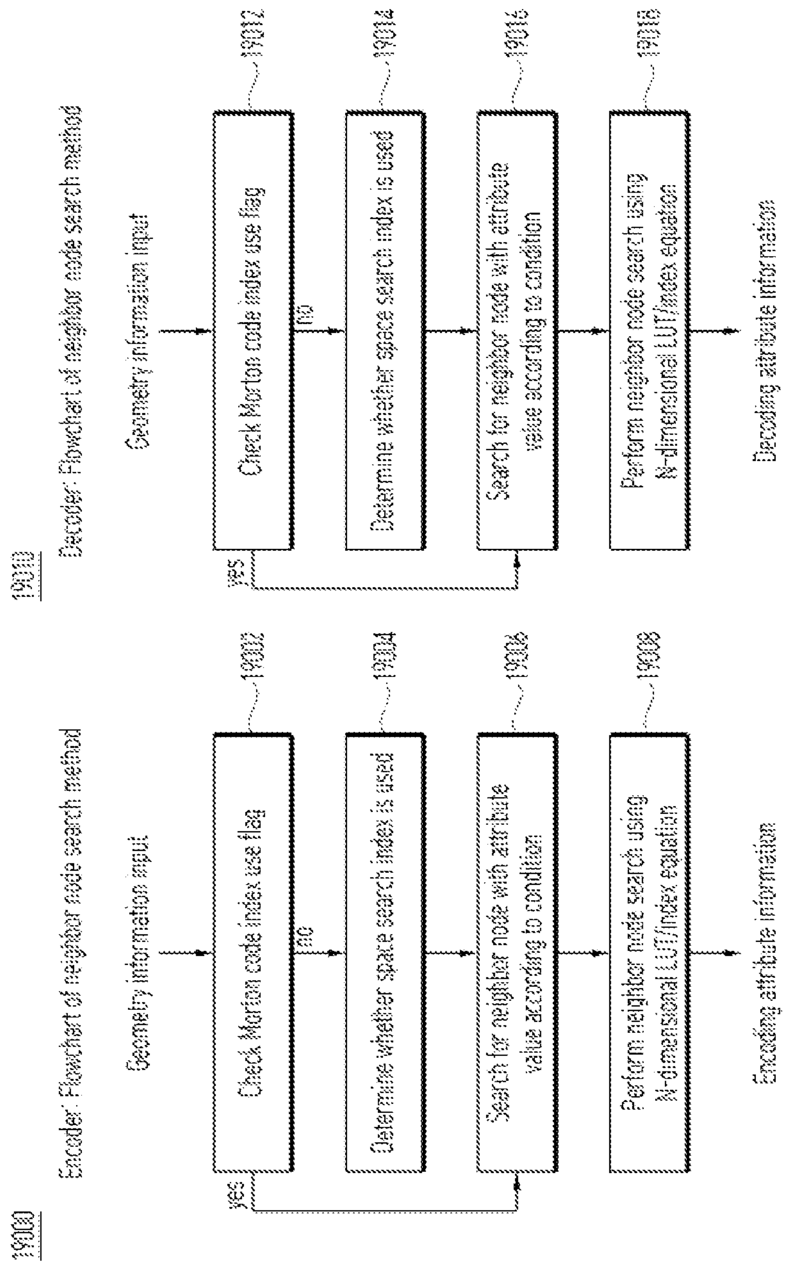
FIG. 19 is a block diagram illustrating an example of an attribute information encoder and an attribute information decoder according to embodiments.

FIG. 19 is a block diagram illustrating an example of an attribute information encoder 19000 and an attribute information decoder 19010 according to embodiments.

The attribute information encoder 19000 may generate an attribute information bitstream based on the reconstructed geometry information. The generated geometry information bitstream and attribute information bitstream may be compressed into a bitstream and transmitted to the attribute information decoder 19010. The compressed bitstream may contain signaling information related to the geometry information bitstream and the attribute information bitstream.

The attribute information encoder 19000 may correspond to the encoder 10002 of FIG. 1, the transmission device of FIG. 4, or the transmission device of FIG. 12, and may encode the attribute information. The attribute information encoder 19000 may include the LOD generator 40009 of FIG. 4 or the prediction/lifting/RAHT transform processor 12010 of FIG. 12. Although not shown in FIG. 19, the attribute information encoder 19000 may further include one or more elements to perform the attribute information encoding described above with reference to FIGS. 1 to 18. Each element of the attribute information encoder 19000 may correspond to hardware, software, a processor, and/or a combination thereof.

The attribute information encoder 19000 checks a flag indicating whether a Morton code-based index is used (19002). The Morton code-based index may include a Morton code index obtained by converting the coordinate values of the point cloud data into Morton code, or a sequence index obtained by sorting the Morton code indexes in order.

When the attribute information encoder 19000 does not use the Morton code-based index (no), the attribute information encoder 19000 may determine whether an index based on another space search algorithm is used (19004). The other space search algorithm may include, for example, a Hilbert curve, a Peano curve, or a Gray curve as a sorting method for points. In this case, the index based on the other space search algorithm may include an index obtained by transforming the coordinate data of the points according to the above-described sorting methods, or a sequence index assigned based on the sorted order.

When the attribute information encoder 19000 uses the Morton code-based index (yes), the attribute information encoder 19000 may search for neighbors of the current point according to the search conditions (19006). In this case, the neighbor point search may be performed on points that are in a specific range (search range) from the current point among the points that are sorted by a specific sorting method (a Morton curve, a Hilbert curve, a Peano curve, a Gray curve, or the like).

Further, the attribute information encoder 19000 may search for neighbor points through an index calculation process based on a neighbor node table (or look up table) of an N-dimensional space (19008). For example, when the points are sorted in Morton order, points that are at a large index distance from the current point may be searched for as neighbor points by referencing the values contained in the rows and columns of the neighbor node table based on the Morton code index. The neighbor point search based on the neighbor node table according to the embodiments is illustrated in FIG. 18.

The attribute information decoder 19010 may perform the decoding operation described above with reference to FIGS. 1 to 14. It may perform the decoding operation corresponding to the reverse process of the encoding operation of the attribute information encoder 19000.

The attribute information decoder 19010 may correspond to the decoder 10006 of FIG. 1, the reception device of FIG. 11, or the reception device of FIG. 13, and may decode the attribute information. The attribute information decoder 19000 may include the LOD generator 11008 of FIG. 11 or the prediction/lifting/RAHT inverse transform processor 13009 of FIG. 13. Although not shown in FIG. 19, the attribute information decoder 19010 may further include one or more elements to perform the attribute information encoding described with reference to FIGS. 1 to 18. Each element of the attribute information decoder 19010 may correspond to hardware, software, a processor, and/or a combination thereof.

The attribute information decoder 19010 check a flag indicating whether a Morton code-based index is used (19012). The Morton code-based index may include a Morton code index obtained by converting the coordinate values of the point cloud data into Morton code, or a sequence index obtained by sorting the Morton code indexes in order.

When the attribute information decoder 19010 does not use the Morton code-based index (no), the attribute information decoder 19010 may determine whether an index based on another space search algorithm is used (19014). The other space search algorithm may include, for example, a Hilbert curve, a Peano curve, or a Gray curve as a sorting method for points. In this case, the index based on the other space search algorithm may include an index obtained by transforming the coordinate data of the points according to the above-described sorting methods, or a sequence index assigned based on the sorted order.

When the attribute information decoder 19010 uses the Morton code-based index (yes), the attribute information decoder 19010 may search for neighbors of the current point according to the search conditions (19016). In this case, the neighbor point search may be performed on points that are in a specific range (search range) from the current point among the points that are sorted by a specific sorting method (a Morton curve, a Hilbert curve, a Peano curve, a Gray curve, or the like).

Further, the attribute information decoder 19010 may search for neighbor points through an index calculation process based on a neighbor node table (or look up table) of an N-dimensional space (19018). For example, when the points are sorted in Morton order, points that are at a large index distance from the current point may be searched for as neighbor points by referencing the values contained in the rows and columns of the neighbor node table based on the Morton code index. The neighbor point search based on the neighbor node table according to the embodiments is illustrated in FIG. 18.

The neighbor node table (look up table, LUT) according to embodiments may be generated before a neighbor point search based on a specific sorting method (e.g., Morton order) after the geometry information is compressed by the transmission device according to embodiments (the transmission device of FIGS. 1, 4, and 12 or the attribute information encoder of FIG. 19). The transmission device may signal information about the neighbor node table to the reception device (the reception device of FIG. 1, 11, or 13, or the attribute information decoder of FIG. 19). The information about the neighbor node table may be positioned in various parts of the bitstream.

Figure 20:
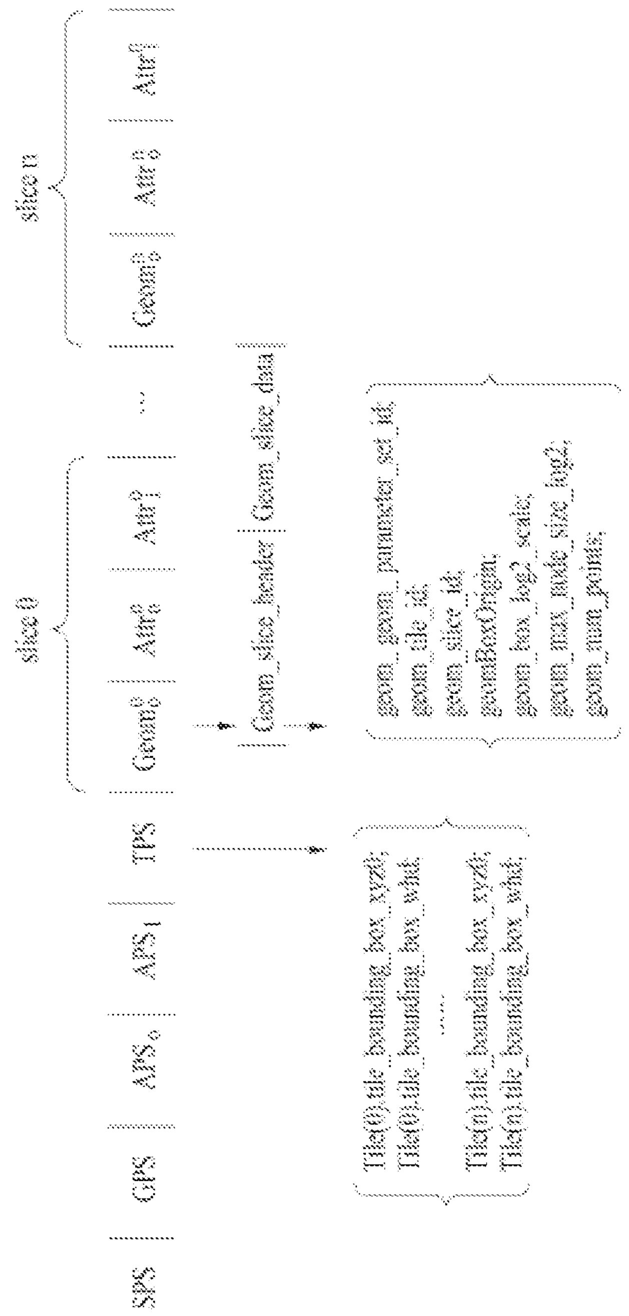
FIG. 20 illustrates an example of encoded point cloud data according to embodiments.

FIG. 20 illustrates an example of encoded point cloud data according to embodiments.

The transmission device according to the embodiments (e.g., the transmission device of FIG. 1, 4, or 12 or the attribute information encoder of FIG. 19) may encode the point cloud data and transmit a bitstream containing the encoded point cloud data to the reception device of the embodiments (e.g., the reception device of FIG. 1, 11, or 13 or the attribute information decoder of FIG. 19).

The encoded point cloud data (or bitstream) according to the embodiments may be generated by the point cloud video encoder 10002 of FIG. 1, the encoder 20001 of FIG. 2, the transmission device of FIG. 4, the transmission device of FIG. 12, the XR device 1430 of FIG. 14, the attribute information encoder 19000 of FIG. 19, and/or hardware, software, firmware, or a combination thereof including one or more processors or integrated circuits configured to communicate with one or more memories.

Also, the encoded point cloud data (bitstream) according to the embodiments may be decoded by the point cloud video decoder 10006 of FIG. 1, the decoder 20003 of FIG. 2, the decoder of FIG. 11, the reception device of FIG. 13, the XR device 1430 of FIG. 14, the attribute information decoder 19010 of FIG. 19, and/or hardware, software, firmware, or a combination thereof including one or more processors or integrated circuits configured to communicate with one or more memories.

The transmission/reception device according to the embodiments may signal a predictive tree structure to perform a neighbor point search. Parameters (which may be referred to as various terms such as metadata and signaling information) according to embodiments may be generated in a process of the transmission device according to embodiments, and may be transmitted to the reception device according to embodiments so as to be used in reconstructing the point cloud data. For example, the parameters may be generated by the metadata processor (or metadata generator) of the transmission device according to embodiments described below and acquired by the metadata parser of the reception device according to the embodiments.

The abbreviations shown in FIG. 20 have the following meanings.

SPS: Sequence Parameter Set

GPS: Geometry Parameter Set

APS: Attribute Parameter Set

TPS: Tile Parameter Set

Geom: Geometry bitstream=geometry slice header+geometry slice data

Attr: Attribute bitstream=attribute slice header+attribute slice data

Referring to FIG. 20, information about the neighbor point search may be defined in a parameter set, a slice header, or slice data. The slice header may correspond to a data unit header, and the slice data may correspond to a data unit. In addition, the defined syntax elements may be defined in corresponding or separate positions, depending on the application or system, such that the scope and application of the syntax elements may be configured differently.

In addition, when the defined syntax elements are applicable to a plurality of point cloud data streams as well as a point cloud data stream, the related information may be carried in a higher-level parameter set and delivered to the reception device.

Parameters (which may be referred to as various terms such as metadata and signaling information) according to embodiments may be generated in a data processing process of the transmission device (the transmission device of FIG. 1, 4, 12, or 14, or the attribute information encoder of FIG. 19), and may be transmitted to the reception device (the reception device of FIGS. 1, 11, 13, 14, or the attribute information decoder of FIG. 19) so as to be used in reconstructing the point cloud data. For example, the parameters may be generated by the metadata processor (or metadata generator) of the transmission device according to embodiments described below and acquired by the metadata parser of the reception device according to the embodiments.

The point cloud data transmission/reception device according to the embodiments may provide tiles or slices to allow point cloud data to be divided into regions to be processed. The point cloud data transmission/reception device according to the embodiments may provide tiles, or slices, to divide the point cloud data into regions for processing. When the point cloud data is divided into regions, each region may have a different level of importance. Different filters or different filter units may be applied based on the importance, and filtering methods with higher complexity but higher quality results may be applied to important regions.

By allowing different filtering to be applied per region (region divided into tiles or slices) depending on the processing capacity of the reception device, instead of using a complicated filtering method for the entire point cloud, better image quality may be ensured for regions that are important to the user and appropriate latency may be ensured for the system.

When point cloud data is partitioned into tiles, different filters or different filter units may be applied to the respective tiles. When the point cloud data is partitioned into slices, different filters or different filter units may be applied to the respective slices.

The parameters for the neighbor point search according to the embodiments may be applied to each parameter set and signaled.

FIG. 21 shows an example of syntax of a sequence parameter set according to embodiments. Information about the neighbor point search according to the embodiments may be signaled over the SPS.

morton_index_use_flag indicates whether the Morton code index is used for neighbor point search (True indicates that the Morton code index is used for neighbor point search, and False indicates that another index is used for neighbor point search).

space_index_search_method may indicate a point sorting method (or space indexing method) other than the Morton code index (0: Peano curve, 1: Gray curve, 2: Hilbert curve, 3: other point sorting or indexing methods).

NDim_LUT may indicate an array of indexes in an N-dimensional neighbor node table (or look up table) for neighbor point search. It may be applied based on the Morton code index or the indexing method indicated by the space_index_search_method.

neighbour_search_function may indicate whether neighbor points at a close Euclidean distance calculated based on the index are searched for in performing the neighbor point search. It may be applied based on the Morton code index or the method indicated by the space_index_search_method. Alternatively, the neighbour_search_function may indicate a calculation method for searching for neighboring points in the neighbor node table based on the index of the current point.

profile_idc may indicate a profile to which the bitstream conforms as specified in Annex A in the H.264 standard document. Bitstreams shall not contain values of profile_idc other than those specified in Annex A. Other values of profile_idc are reserved for future use by ISO/JEC.

profile_compatibility_flags indicates that the bitstream conforms to the profile indicated by profile_idc, such as j as specified in Annex A. The value of profile_compatibility_flag[j] may be 0 for any value of j that is not specified in Annex A as an allowed value of profile_idc.

level_idc indicates the level to which the bitstream may conform as specified in Annex A in the H.264 standard document. Bitstreams shall not contain values of level_idc other than those specified in Annex A. Other values of level_idc may be reserved for future use by ISO/JEC.

sps_bounding_box_present_flag equal to 1 indicates that the bounding box offset and size information is signaled. sps_bounding_box_present_flag equal to 0 indicates sps_bounding_box_offset_x indicates the x offset of the source bounding box in the Cartesian coordinates. When not present, the value of sps_bounding_box_offset_x is inferred to be 0.

sps_bounding_box_offset_y indicates the y offset of the source bounding box in the Cartesian coordinates. When not present, the value of sps_bounding_box_offset_y is inferred to be 0.

sps_bounding_box_offset_z indicates the z offset of the source bounding box in the Cartesian coordinates. When not present, the value of sps_bounding_box_offset_z is inferred to be 0.

sps_bounding_box_scale_factor indicates the scale factor of the source bounding box in the Cartesian coordinates. When not present, the value of sps_bounding_box_scale_factor is inferred to be 1. When not present, the value of sps_bounding_box_scale_factor is inferred to be 0.

sps_bounding_box_size_width indicates the width of the source bounding box in Cartesian coordinates. When not present, the value of sps_bounding_box_size_width is inferred to be 10.

sps_bounding_box_size_height indicates the height of the source bounding box in Cartesian coordinates. When not present, the value of sps_bounding_box_size_height is inferred to be 1. When not present, the value of sps_bounding_box_size_height is inferred to be 0.

sps_bounding_box_size_depth indicates the depth of the source bounding box in Cartesian coordinates. When not present, the value of sps_bounding_box_size_depth is inferred to be 1 sps_source_scale_factor indicates the scale factor of the source point cloud.

sps_seq_parameter_set_id provides an identifier for the SPS for reference by other syntax elements. The value of sps_seq_parameter_set_id shall be in the range of 0 to 15, inclusive in bitstreams conforming to this version of this Specification. The value other than 0 for sps_seq_parameter_set_id is reserved for future use by ISO/IEC.

sps_num_attribute_sets indicates the number of coded attributes in the bitstream. The value of sps_num_attribute_sets shall be in the range of 0 to 64.

attribute_dimension[i] specifies the number of components of the i-th attribute.

attribute_instance_id[i] specifies attribute instance id.

attribute bitdepth[i] specifies the bitdepth of the i-th attribute signal.

attribute_cicp_colour_primaries[i] indicates the chromaticity coordinates of the color attribute source primaries.

attribute_cicp_transfer_characteristics[i] either indicates the reference opto-electronic transfer characteristic function of the color attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1.)

attribute_cicp_matrix_coeffs[i] describes the matrix coefficients used in deriving luma and chroma signals from the green, blue, and red, or Y, Z, and X primaries.

FIG. 22 shows an example of syntax of a tile parameter set according to embodiments. Information about the neighbor point search according to the embodiments may be signaled over the TPS.

morton_index_use_flag indicates whether the Morton code index is used for neighbor point search (True indicates that the Morton code index is used for neighbor point search, and False indicates that another index is used for neighbor point search).

space_index_search_method may indicate a point sorting method (or space indexing method) other than the Morton code index (0: Peano curve, 1: Gray curve, 2: Hilbert curve, 3: other point sorting or indexing methods).

NDim_LUT may indicate an array of indexes in an N-dimensional neighbor node table (or look up table) for neighbor point search. It may be applied based on the Morton code index or the indexing method indicated by the space_index_search_method.

neighbour_search_function may indicate whether neighbor points at a close Euclidean distance calculated based on the index are searched for in performing the neighbor point search.

It may be applied based on the Morton code index or the method indicated by the space_index_search_method. Alternatively, the neighbour_search_function may indicate a calculation method for searching for neighboring points in the neighbor node table based on the index of the current point.

num_tiles indicates the number of tiles signaled for the bitstream. When not present, num_tiles is inferred to be 0.

tile_bounding_box_offset_x[i] indicates the x offset of the i-th tile in Cartesian coordinates. When not present, the value of tile_bounding_box_offset_x[0] is inferred to be sps_bounding_box_offset_x.

tile_bounding_box_offset_y[i] indicates the y offset of the i-th tile in Cartesian coordinates. When not present, the value of tile_bounding box_offset_y[0] is inferred to be sps_bounding_box_offset_y.

tile_bounding_box_offset_z[i] indicates the z offset of the i-th tile in Cartesian coordinates. When not present, the value of tile_bounding_box_offset_z[0] may be inferred to be sps_bounding_box_offset_z.

tile_bounding_box_scale_factor[i] indicates the scale factor of the i-th tile in the Cartesian coordinates. When not present, the value of tile_bounding_box_scale_factor[0] is inferred to be sps_bounding_box_scale_factor.

tile_bounding_box_size_width[i] indicates the width of the i-th tile in the Cartesian coordinates. When not present, the value of tile_bounding_box_size_width[0] is inferred to be sps_bounding_box_size_width.

tile_bounding_box_size_height[i] indicates the height of the i-th tile in the Cartesian coordinates. When not present, the value of tile_bounding_box_size_height[0] is inferred to be sps_bounding_box_size_height.

tile_bounding_box_size_depth[i] indicates the depth of the i-th tile in the Cartesian coordinates. When not present, the value of tile_bounding_box_size_depth[0] is inferred to be sps_bounding_box_size_depth.

FIG. 23 shows an example of syntax of a geometry parameter set according to embodiments. Information about the neighbor point search according to the embodiments may be signaled over the GPS.

morton_index_use_flag indicates whether the Morton code index is used for neighbor point search (True indicates that the Morton code index is used for neighbor point search, and False indicates that another index is used for neighbor point search).

space_index_search_method may indicate a point sorting method (or space indexing method) other than the Morton code index (0: Peano curve, 1: Gray curve, 2: Hilbert curve, 3: other point sorting or indexing methods).

NDim_LUT may indicate an array of indexes in an N-dimensional neighbor node table (or look up table) for neighbor point search. It may be applied based on the Morton code index or the indexing method indicated by the space_index_search_method.

neighbour_search_function may indicate whether neighbor points at a close Euclidean distance calculated based on the index are searched for in performing the neighbor point search.

It may be applied based on the Morton code index or the method indicated by the space_index_search_method. Alternatively, the neighbour_search_function may indicate a calculation method for searching for neighboring points in the neighbor node table based on the index of the current point.

gps_geom_parameter_set_id provides a GPS identifier for reference by other syntax elements. The value of gps_seq_parameter_set_id shall be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

geometry_coding_type indicates the geometry coding type in Table 71 for the value of geometry_coding_type. The value of geometry_coding_type shall be equal to 0 or 1 in bitstreams conforming to this version of this Specification. Other values of geometry_coding_type are reserved for future use by ISO/IEC. Decoders conforming to this version of this Specification shall disregard reserved values of geometry_coding_type (0=octree, 1=Triangle Soup (Trisoup)).

gps_box_present_flag equal to 1 specifies that additional bounding box information is provided in a geometry header that references the current GPS. gps bounding_box_present_flag equal to 0 specifies that additional bounding box information is not signaled in the geometry header.

unique_geometry_points_flag equal to 1 indicates that the positions of all output points are unique. unique_geometry_points_flag equal to 0 indicates that the positions of the output points may be the same.

neighbour_context_restriction_flag equal to 0 indicates that octree occupancy coding uses contexts determined from six neighboring parent nodes. neighbour_context_restriction_flag equal to 1 indicates that octree coding uses contexts determined from sibling nodes only.

inferred_direct_coding_mode_enabled_flag equal to 0 indicates the octree coding uses inferred_direct_coding_mode. inferred_direct_coding_mode_enabled_flag equal to 1 indicates that the octree coding uses multiple contexts determined from sibling neighbor nodes.

bitwise_occupancy_coding_flag equal to 1 indicates that geometry node occupancy is encoded using bitwise contextualisation of the syntax element ocupancy_map. bitwise_occupancy_coding_flag equal to 0 indicates that geometry node occupancy is encoded using the dictionary encoded with the syntax element occypancy_byte.

adjacent_child_contextualisation_enabled_flag equal to 1 indicates that the adjacent children of neighboring octree nodes are used for bitwise occupancy contextualization. adjacent_child_contextualization_enabled_flag equal to 0 indicates that the children of neighboring octree nodes are not used for the occupancy contextualization.

log 2_neighbour_avail_boundary specifies the value of the variable NeighbAvailBoundary that is used in the decoding process as follows:

NeighbAvailBoundary=2 log 2_neighbour_avail_boundary.

When neighbor_context_restriction_flag is equal to 1, NeighbAvailabilityMask is set equal to 13. When neighbour_context_restriction_flag is equal to 0, NeighbAvailabilityMask is set as follows:

1<<log 2_neighbour_avail_boundary.

log 2_intra_pred_max_node_size specifies.

log 2_trisoup_node_size specifies the variable TrisoupNodeSize as the size of the triangle nodes as follows:

TrisoupNodeSize=2 log 2_trisoup_node_size.

The value of log 2_trisoup_node_size shall be equal to or greater than 0. When log 2_trisoup_node_size is equal to 0, the geometry bitstream includes only the octree coding syntax.

trisoup_depth specifies the number of bits used to represent each component of a point coordinate. The value of trisoup_depth shall be in the range of 2 to 21. [Ed(df): 21 should perhaps be a level limit].

trisoup_triangle_level specifies the level at which the octree is pruned. The value of trisoup_triangle_level shall be in the range of 1 to trisoup_depth−1.

gps_extensionpresent_flag equal to 1 specifies that the gps_extension_data syntax structure is present in the GPS RBSP syntax structure. gps_extension_present_flag equal to 0 specifies that this syntax structure is not present. When not present, the value of gps_extension_present_flag is inferred to be equal to 0.

gps_extension_data_flag may have any value. Its presence and value do not affect decoder conformance to profiles specified in Annex A. Decoders conforming to a profile specified in Annex A.

FIG. 24 shows an example of syntax of an attribute parameter set according to embodiments. Information about the neighbor point search according to the embodiments may be signaled over the APS.

morton_index_use_flag indicates whether the Morton code index is used for neighbor point search (True indicates that the Morton code index is used for neighbor point search, and False indicates that another index is used for neighbor point search).

space_index_search_method may indicate a point sorting method (or space indexing method) other than the Morton code index (0: Peano curve, 1: Gray curve, 2: Hilbert curve, 3: other point sorting or indexing methods).

NDim_LUT may indicate an array of indexes in an N-dimensional neighbor node table (or look up table) for neighbor point search. It may be applied based on the Morton code index or the indexing method indicated by the space_index_search_method.

neighbour_search_function may indicate whether neighbor points at a close Euclidean distance calculated based on the index are searched for in performing the neighbor point search.

It may be applied based on the Morton code index or the method indicated by the space_index_search_method. Alternatively, the neighbour_search_function may indicate a calculation method for searching for neighboring points in the neighbor node table based on the index of the current point.

aps_attr_parameter_set_id provides an identifier for the APS for reference by other syntax elements. The value of aps_attr_parameter_set_id shall be in the range of 0 to 15, inclusive.

aps_seq_parameter_set_id specifies the value of sps_seq_parameter_set_id for the active SPS. The value of aps_seq_parameter_set_id shall be in the range of 0 to 15, inclusive.

attr_coding_type indicates the coding type for the attribute in Table 72 Table 72 for the given value of attr_coding_type.

The value of attr_coding_type shall be equal to 0, 1, or 2 in bitstreams conforming to this version of this Specification. Other values of attr_coding_type are reserved for future use by ISO/JEC. Decoders conforming to this version of this Specification shall ignore reserved values of attr_coding_type (0=Predicting weight lifting, 1=Region Adaptive Hierarchical Transferm(RAHT), 2=Fixed weight lifting).

num_pred_nearest specifies the maximum number of nearest neighbors to be used for prediction. The value of numberOfNearestNeighboursInPrediction shall be in the range of 1 to xx.

max_num_direct_predictors specifies the maximum number of predictors to be used for direct prediction. The value of max_num_direct_predictors shall be in the range of 0 to num_pred_nearest neighbors. The value of the variable MaxNumPredictors that is used in the decoding process is given as follows:

MaxNumPredictors=max_num_direct_predicots+1.

lifting_search_range specifies a search range for the lifting.

lifting_quant_step_size specifies the quantization step size for the first component of the attribute. The value of quant_step_size shall be in the range of 1 to xx.

lifting_quant_step_size_chroma specifies the quantization step size for the chroma component of the attribute when the attribute is color. The value of quant_step_size_chroma shall be in the range of 1 to xx.

lod_binary_tree_enabled_flag specifies whether the binary tree is enabled or not for the log generation num_detail_levels_minus1 specifies the number of levels of detail for the attribute coding. The value of num_detail_levels_minus1 shall be in the range of 0 to xx.

sampling_distance_squared[idx] specifies the square of the sampling distance for idx. The value of sampling_distance_squared[ ] shall be in the range of 0 to xx.

adaptive_prediction_threshold specifies the threshold of prediction.

raht_depth specifies the number of levels of detail for RAHT. The value of depthRAHT shall be in the range of 1 to xx.

raht_binarylevel_threshold specifies the levels of detail to cut out the RAHT coefficient.

The value of binaryLevelThresholdRAHT shall be in the range of 0 to xx.

raht_quant_step_size specifies the quantization step size for the first component of the attribute. The value of quant_step_size shall be in the range of 1 to xx.

aps_extension_present_flag equal to 1 specifies that the aps_extension_data syntax structure is present in the APS RBSP syntax structure. aps_extension_present_flag equal to 0 specifies that this syntax structure is not present. When not present, the value of aps_extension_present_flag is inferred to be equal to 0.

ps_extension_data_flag may have any value. Its presence and value do not affect decoder conformance to profiles specified in Annex A. Decoders conforming to a profile specified in Annex A.

FIG. 25 shows an example of syntax of a geometry slice header according to embodiments. Information about the neighbor point search according to the embodiments may be signaled over the geometry slice header.

morton_index_use_flag indicates whether the Morton code index is used for neighbor point search (True indicates that the Morton code index is used for neighbor point search, and False indicates that another index is used for neighbor point search).

space_index_search_method may indicate a point sorting method (or space indexing method) other than the Morton code index (0: Peano curve, 1: Gray curve, 2: Hilbert curve, 3: other point sorting or indexing methods).

NDim_LUT may indicate an array of indexes in an N-dimensional neighbor node table (or look up table) for neighbor point search. It may be applied based on the Morton code index or the indexing method indicated by the space_index_search_method.

neighbour_search_function may indicate whether neighbor points at a close Euclidean distance calculated based on the index are searched for in performing the neighbor point search.

It may be applied based on the Morton code index or the method indicated by the space_index_search_method. Alternatively, the neighbour_search_function may indicate a calculation method for searching for neighboring points in the neighbor node table based on the index of the current point.

gsh_geometry_parameter_set_id specifies the value of gps_geom_parameter_set_id of the active GPS.

gsh_tile_id specifies the ID of a tile.

gsh_slice_id specifies the ID of a slice.

gsh_box_log 2_scale specifies a scale value.

gsh_box_origin_x specifies the x of the source bounding box in the Cartesian coordinates.

gsh_box_origin_y specifies the y of the source bounding box in the Cartesian coordinates.

gsh_box_origin_z specifies the z of the source bounding box in the Cartesian coordinates.

gsh_log 2_max_nodesize specifies the value of the variable MaxNodeSize that is used in the decoding process as follows:

MaxNodeSize=2(gsh_log 2_max_nodesize).

gsh_points_number specifies the number of coded points in the slice.

Figure 26:
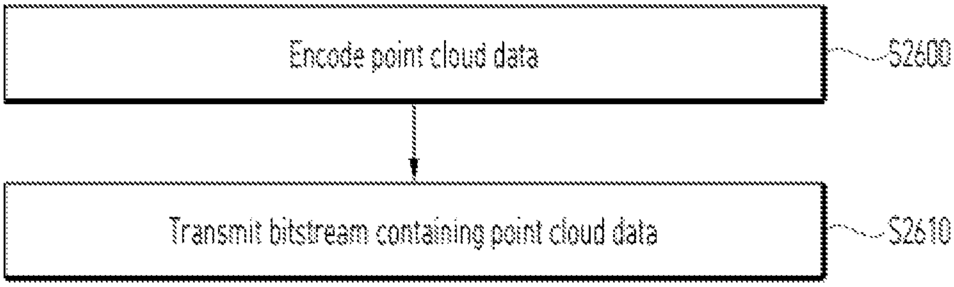
FIG. 26 illustrates an example of a method of transmitting point cloud data according to embodiments.

FIG. 26 illustrates an example of a method of transmitting point cloud data according to embodiments. The point cloud data transmission method according to the embodiments may be performed by the transmission device according to the embodiments (the transmission device of FIG. 1, 4, or 12, or the attribute information encoder of FIG. 19).

The point cloud data transmission method, according to the embodiments includes encoding point cloud data (S2600) and transmitting a bitstream containing the point cloud data (S2610).

The encoding of the point cloud data (S2600) may be performed by the point cloud video encoder 10002 of FIG. 1, the encoder 20001 of FIG. 2, the encoder of FIG. 4, the transmission device of FIG. 12, the XR device 1430 of FIG. 14, the attribute information encoder 19000 of FIG. 19, and/or hardware, software, firmware, or a combination thereof including one or more processors or integrated circuits configured to communicate with one or more memories.

The transmitting of the bitstream containing the point cloud data (S2610) may be performed by the transmitter 10003 of FIG. 1, the transmission processor 12012 of FIG. 12, the XR device 1430 of FIG. 14, the attribute information encoder 19000 of FIG. 19, and/or hardware, software, firmware, or a combination thereof including one or more processors or integrated circuits configured to communicate with one or more memories.

The encoding of the point cloud data (S2600) may include encoding geometry information about the point cloud data, and encoding attribute information about the point cloud data. The encoding of the attribute information about the point cloud data may be performed by the attribute information encoder 19000 of FIG. 19.

The encoding of the attribute information may include generating a level of detail (LOD) and sorting the points in order according to a specific sorting method. The attribute information encoder 19000 may generate the LOD and sort the points in each level of the LOD according to the specific sorting method. The specific sorting method may include a sorting method for the points based on various space search algorithms, such as a Morton curve, a Hilbert curve, a Peano curve, or a Gray curve. The operation of generating the LOD may be performed by the LOD generator 40009 of FIG. 4.

Further, the encoding of the attribute information includes searching for a neighbor point for the point to predict the attribute information. The attribute information encoder 19000 may predict the attribute information about the current point by searching for a neighbor point having attribute information similar to the attribute information about the current point, and may encode the residual information about the predicted attribute information and the source attribute information and transmit the same to the attribute information decoder 19010.

The searching for the neighbor point by the attribute information encoder 19000 may include searching for points in a specific range from the current point based on the order of the points sorted in a specific method. For example, points whose indexes are within a range of 128 indexes around the current point may be searched for as neighbor points. Related description is given with reference to FIGS. 15 and 16.

Further, the searching for a neighbor point by the attribute information encoder 19000 may include acquiring information about the neighbor point for the current point from a neighbor node table according to embodiments. Here, the neighbor node table includes information about points that are outside the specific range from the current point and have an Euclidean distance from the current point that is within a specific distance (e.g., 1 to 13). The neighbor node table may be an array containing rows and columns.

When searching for a neighbor point, the attribute information encoder 19000 may acquire information about the neighbor point by referencing values contained in a row or column of the neighbor node table based on an index (e.g., a Morton code index) of the current point according to a specific sorting method. Related description is given with reference to FIGS. 17 and 18.

When the attribute information encoder 19000 encodes the attribute information according to the embodiments, the method of sorting the points may be based on various space search algorithms. The method of sorting the points includes sorting based on a Morton curve, a Hilbert curve, a Peano curve, or a Gray curve.

Figure 27:
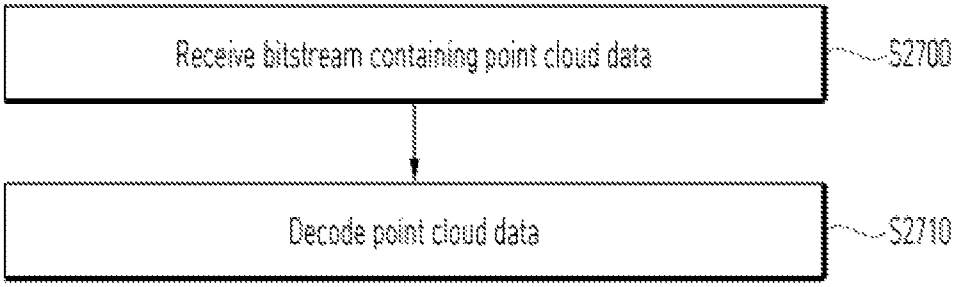
FIG. 27 illustrates an example of a method of receiving point cloud data according to embodiments.

FIG. 27 illustrates an example of a method of receiving point cloud data according to embodiments. The point cloud data reception method according to the embodiments may be performed by the reception device of FIG. 1, 11, or 13, or the attribute information decoder 19010 of FIG. 19.

The point cloud data reception method according to the embodiments includes receiving a bitstream containing point cloud data (52700) and decoding the point cloud data (S2710), wherein the decoding of the point cloud data (S2710) includes decoding geometry information about the point cloud data and decoding attribute information about the point cloud data.

The receiving of the bitstream containing the point cloud data (52700) may be performed by the reception device 10004 of FIG. 1, the reception device of FIGS. 10 and 11, the receiver 13000 of FIG. 13, the XR device 1430 of FIG. 14, the attribute information decoder of FIG. 19, and/or hardware, software, firmware, or a combination thereof including one or more processors or integrated circuits configured to communicate with one or more memories.

The decoding of the point cloud data (S2710) may be performed by the point cloud video decoder 10006 of FIG. 1, the reception device of FIG. 10, 11, or 13, the XR device 1430 of FIG. 14, the attribute information decoder of FIG. 19, and/or hardware, software, firmware, or a combination thereof including one or more processors or integrated circuits configured to communicate with one or more memories.

The decoding of the attribute information may include generating a level of detail (LOD) and sorting the points in order according to a specific sorting method. The attribute information decoder 19010 may generate the LOD and sort the points in each level of the LOD according to the specific sorting method. The specific sorting method may include a sorting method for the points based on various space search algorithms, such as a Morton curve, a Hilbert curve, a Peano curve, or a Gray curve. The attribute information decoder 19010 may sort the points according to a specific sorting method based on the signaling information received from the transmission device according to embodiments. The operation of generating the LOD may be performed by the LOD generator 11008 of FIG. 11.

Further, the decoding of the attribute information includes searching for a neighbor point for the point to predict the attribute information. The attribute information decoder 19010 may predict the attribute information about the current point by searching for a neighbor point having attribute information similar to the attribute information about the current point, and may restore the attribute information by summing the residual information received from the attribute information encoder 19000 with the predicted attribute information.

The searching for the neighbor point by the attribute information decoder 19010 may include searching for points in a specific range from the current point based on the order of the points sorted in a specific method. For example, points whose indexes are within a range of 128 indexes around the current point may be searched for as neighbor points. Related description is given with reference to FIGS. 15 and 16.

Further, the searching for a neighbor point by the attribute information decoder 19010 may include acquiring information about the neighbor point for the current point from a neighbor node table according to embodiments. Here, the neighbor node table includes information about points that are outside the specific range from the current point and have an Euclidean distance from the current point that is within a specific distance (e.g., 1 to 13). The neighbor node table may be an array containing rows and columns. Information about the neighbor node table may be received from the attribute information encoder 19000.

When searching for a neighbor point, the attribute information decoder 19010 may acquire information about the neighbor point by referencing values contained in a row or column of the neighbor node table based on an index (e.g., a Morton code index) of the current point according to a specific sorting method. Related description is given with reference to FIGS. 17 and 18.

When the attribute information decoder 19010 decodes the attribute information according to the embodiments, the method of sorting the points may be based on various space search algorithms. The method of sorting the points includes sorting based on a Morton curve, a Hilbert curve, a Peano curve, or a Gray curve.

Each element of the attribute information encoder 19000 may correspond to hardware, software, a processor, and/or a combination thereof.

The search for neighbor points according to embodiments is proposed to efficiently compress point cloud data. When points are sorted based on a specific sorting method and only points within a specific range based on the index of the current point are considered as neighbor points, points that are actually positioned at a close distance but are far away in terms of index (jumping points) may not be considered as neighbor points. The transmission/reception device according to embodiments may consider jumping points as neighbor points by acquiring information about the jumping points by referencing the neighbor node table. Searching for closer points as neighbor points may improve the accuracy of prediction of the current point. As the prediction accuracy is improved, the size of the residual information transmitted may decrease. Thereby, the efficiency of data transmission and reception and the processing efficiency may be increased.

Embodiments have been described in terms of the method and/or device, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data, the method comprising:

encoding geometry information of point cloud data; and encoding attribute information of the point cloud data, wherein the encoding attribute information includes:

generating levels of detail (LoDs) based on reconstructed geometry information, searching neighbor points for points of a level of the LoDs;

predicting attribute information for the points based on the searched neighbor points, and wherein the searching neighbor points for points of the level includes:

searching first neighbor points based on relative locations related to a block for a point of the points and a size of the block; and searching second neighbor points based on a scaled morton order.

2. The method of claim 1, wherein a neighbor of the first neighbor points is searched based on acquiring information about the neighbor for the point from a neighbor node table, wherein the neighbor node table contains information about points having a Euclidean distance from the point within a specific distance among points outside the specific range from the point.

3. The method of claim 2, wherein the neighbor node table is an array containing rows and columns, wherein the searching the first neighbor points comprises:

acquiring information about the neighbor by referencing the rows and columns of the neighbor node table based on indexes of the points according to the specific sorting method.

4. The method of claim 3, wherein the specific sorting method is sorting the points based on a Morton curve, a Hilbert curve, a Peano curve, or a Gray curve.

5. A device comprising:

a memory; and at least one processor connected to the memory, the at least one processor configured to:

encode geometry information of point cloud data; and encode attribute information of the point cloud data, wherein the at least one processor is further configured to:

generate levels of detail (LoDs) based on reconstructed geometry information, search neighbor points for points of a level of the LoDs;

predict attribute information for the points based on the searched neighbor points, and wherein, to search neighbor points for points of the level, the at least one processor is further configured to:

search first neighbor points based on relative locations related to a block for a point of the points and a size of the block; and search second neighbor points based on a scaled morton order.

6. The device of claim 5, wherein a neighbor of the first neighbor points is searched based on acquiring information about the neighbor for the point from a neighbor node table, wherein the neighbor node table contains information about points having a Euclidean distance from the point within a specific distance among points outside the specific range from the point.

7. The device of claim 6, wherein the neighbor node table is an array containing rows and columns, wherein, in searching the first neighbor points, the at least one processor is further configured to acquire information about the neighbor by referencing the rows and columns of the neighbor node table based on indexes of the points according to the specific sorting method.

8. The device of claim 7, wherein the specific sorting method is sorting the points based on a Morton curve, a Hilbert curve, a Peano curve, or a Gray curve.

9. A method comprising:

decoding geometry information of point cloud data; and decoding attribute information of the point cloud data, wherein the decoding attribute information includes:

generating levels of detail (LoDs) based on the decoded geometry information;

searching neighbor points for points of a level of the LoDs;

predicting attribute information for the points based on the searched neighbor points, and wherein the searching neighbor points for points of the level includes:

searching first neighbor points based on relative locations related to a block for a point of the points and a size of the block; and searching second neighbor points based on a scaled morton order.

10. The method of claim 9, wherein a neighbor of the first neighbor points is searched based on acquiring information about the neighbor point for the point from a neighbor node table, wherein the neighbor node table contains information about points having a Euclidean distance from the point within a specific distance among points outside the specific range from the point.

11. The method of claim 10, wherein the neighbor node table is an array containing rows and columns, wherein the searching the first neighbor points comprises:

acquiring information about the neighbor by referencing the rows and columns of the neighbor node table based on indexes of the points according to the specific sorting method.

12. The method of claim 11, wherein the specific sorting method is sorting the points based on a Morton curve, a Hilbert curve, a Peano curve, or a Gray curve.

13. A device comprising:

a memory; and at least one processor connected to the memory, the at least one processor configured to:

decode geometry information of point cloud data; and decode attribute information of the point cloud data, wherein the at least one processor is further configured to:

generate levels of detail (LoDs) based on the decoded geometry information;

search neighbor points for points of a level of the LoDs;

predict attribute information for the points based on the searched neighbor points, and wherein, to search neighbor points for points of the level, the at least one processor is further configured to:

search first neighbor points based on relative locations related to a block for a point of the points and a size of the block; and search second neighbor points based on a scaled morton order.

14. The device of claim 13, wherein a neighbor of the first neighbor points is searched based on acquiring information about the neighbor for the point from a neighbor node table, wherein the neighbor node table contains information about points having a Euclidean distance from the point within a specific distance among points outside the specific range from the point.

15. The device of claim 14, wherein the neighbor node table is an array containing rows and columns, wherein, in searching the first neighbor points, at least one processor is further configured to acquire information about the neighbor by referencing the rows and columns of the neighbor node table based on indexes of the points according to the specific sorting method.

16. The device of claim 15, wherein the specific sorting method is sorting the points based on a Morton curve, a Hilbert curve, a Peano curve, or a Gray curve.

* * * * *